US011101904B2

(12) United States Patent
Hao et al.

(10) Patent No.: US 11,101,904 B2
(45) Date of Patent: Aug. 24, 2021

(54) COMMUNICATION SCHEMES FOR SMALL CYCLIC DELAY DIVERSITY REFERENCE SIGNALS

(71) Applicant: Qualcomm Incorporated, San Diego, CA (US)

(72) Inventors: Chenxi Hao, Beijing (CN); Yu Zhang, Beijing (CN); Chao Wei, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/491,307

(22) PCT Filed: Aug. 11, 2017

(86) PCT No.: PCT/CN2017/097074
§ 371 (c)(1),
(2) Date: Sep. 5, 2019

(87) PCT Pub. No.: WO2018/201639
PCT Pub. Date: Nov. 8, 2018

(65) Prior Publication Data
US 2020/0052804 A1 Feb. 13, 2020

(30) Foreign Application Priority Data

May 5, 2017 (WO) ................ PCT/CN2017/083185

(51) Int. Cl.
*H04B 17/364* (2015.01)
*H04B 17/24* (2015.01)
(Continued)

(52) U.S. Cl.
CPC ........... *H04B 17/364* (2015.01); *H04B 7/063* (2013.01); *H04B 7/0626* (2013.01); *H04B 17/24* (2015.01);
(Continued)

(58) Field of Classification Search
CPC .... H04B 17/364; H04B 17/24; H04B 17/318; H04B 7/0626; H04B 7/063; H04L 5/005; H04L 5/0057; H04W 72/042
See application file for complete search history.

(56) References Cited

U.S. PATENT DOCUMENTS 9,209,950 B2  12/2015  Luo et al.
2008/0137635 A1  6/2008  Pan et al.
(Continued)

FOREIGN PATENT DOCUMENTS

CN   101997658 A   3/2011
CN   102013959 A   4/2011
(Continued)

OTHER PUBLICATIONS

International Search Report and Written Opinion—PCT/CN2017/083185—ISA/EPO—dated Jun. 29, 2017.
(Continued)

*Primary Examiner* — Ajay Cattungal
(74) *Attorney, Agent, or Firm* — Holland & Hart LLP

(57) ABSTRACT

The described techniques relate to improved methods, systems, devices, or apparatuses that support communication schemes for small cyclic delay diversity (SCDD) reference signals. A base station may transmit a control message comprising at least one channel state information (CSI) configuration parameter to a user equipment (UE). The UE may identify a time offset between a plurality of virtual antennas of the base station based at least in part on the CSI configuration parameter. The UE may perform measurements of a plurality of CSI reference signals (CSI-RSs) transmitted by the base station and associated with the virtual antennas. The UE may transmit a feedback message based at least in part on the determined time offset and the measurements of the CSI-RSs.

56 Claims, 19 Drawing Sheets

(51) Int. Cl.
  *H04B 17/318* (2015.01)
  *H04B 7/06* (2006.01)
  *H04L 5/00* (2006.01)
  *H04W 72/04* (2009.01)

(52) U.S. Cl.
  CPC .......... *H04B 17/318* (2015.01); *H04L 5/005* (2013.01); *H04L 5/0057* (2013.01); *H04W 72/042* (2013.01)

(56) References Cited

U.S. PATENT DOCUMENTS

| | | | |
|---|---|---|---|
| 2012/0176939 A1 | 7/2012 | Qu et al. | |
| 2012/0208547 A1* | 8/2012 | Geirhofer | H04L 5/0032 455/452.2 |
| 2013/0244676 A1* | 9/2013 | Koivisto | H04L 25/0224 455/452.1 |
| 2014/0022988 A1* | 1/2014 | Davydov | H04L 5/0053 370/328 |
| 2015/0223149 A1* | 8/2015 | Liu | H04W 24/08 370/252 |
| 2015/0280801 A1* | 10/2015 | Xin | H04B 7/0632 370/329 |
| 2016/0142189 A1* | 5/2016 | Shin | H04L 5/0048 370/329 |
| 2016/0337874 A1 | 11/2016 | Yang et al. | |
| 2017/0078062 A1* | 3/2017 | Park | H04L 5/0023 |
| 2018/0091992 A1* | 3/2018 | Frenne | H04L 5/0048 |
| 2018/0269950 A1* | 9/2018 | John Wilson | H04B 17/21 |

FOREIGN PATENT DOCUMENTS

| | | |
|---|---|---|
| CN | 102291218 A | 12/2011 |
| CN | 104218982 A | 12/2014 |
| CN | 106033986 A | 10/2016 |
| CN | 106559120 A | 4/2017 |
| KR | 20110093555 A | 8/2011 |
| WO | WO-2013024350 A2 | 2/2013 |
| WO | WO-2013052491 | 4/2013 |
| WO | WO 2015093910 A1 | 6/2015 |
| WO | WO-2016145986 A1 | 9/2016 |
| WO | WO-2018063048 A1 | 4/2018 |

OTHER PUBLICATIONS

International Search Report and Written Opinion—PCT/CN2017/097074—ISA/EPO—dated Jan. 31, 2018.
Supplementary European Search Report—EP17908358—Search Authority—The Hague—dated Dec. 17, 2020.
Samsung: "CQI Definition for PMI/RI Disabled Feedbacks", 3GPP Draft; R1-123461 PMI&RI Disabled, 3rd Generation Partnership Project (3GPP). Mobile Competence Centre; 650. Route Des Lucioles; F-06921 Sophia-Antipolis Cedex; FRANCE, vol. Ran WG1, No. Qingdao. China; Aug. 13, 2012-Aug. 17, 2012, Aug. 5, 2012 (Aug. 5, 2012). XP050661340. Retrieved from the Internet: URL: http://www.3gpp.org/ftp/tsg_ran/WG1_RL1/TSGR1_70/Docs/[retrieved on Aug. 5, 2012], section 3.2.
Supplementary European Search Report—EP17908358—Search Authority—The Hague—dated Mar. 22, 2021.

\* cited by examiner

COMMUNICATION SCHEMES FOR SMALL CYCLIC DELAY DIVERSITY REFERENCE SIGNALS

CROSS-REFERENCE AND PRIORITY CLAIM

The present application is a 371 national phase filing of International Application No. PCT/CN2017/083185 by Hao et al, entitled "COMMUNICATION SCHEMES FOR SMALL CYCLIC DELAY DIVERSITY REFERENCE SIGNALS", filed May 5, 2017, assigned to the assignee hereof, and expressly incorporated herein.

BACKGROUND

The following relates generally to wireless communication, and more specifically to communication schemes for small cyclic delay diversity (SCDD) reference signals.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless communication systems, a transmitting device, such as a base station, may use SCDD by introducing a delay or a small phase offset in a signal sent using a second virtual antenna as compared to signal sent using a first virtual antenna. SCDD may serve to optimize wideband channel estimation and transmissions for high mobility UEs. However, to achieve accurate channel estimation or spectral efficiency, a UE may perform calculations that depend on the phase offset. Due to the phase offset variances in SCDD, CSI feedback estimation by a UE may be difficult or inaccurate.

SUMMARY

The described techniques relate to improved methods, systems, devices, or apparatuses that support communication schemes for small cyclic delay diversity (SCDD) reference signals. Generally the described techniques provide for flexible application of a time offset indication for derivation of channel state information (CSI). For example, the time or phase offset may be configured by the network, a user equipment (UE), or a combination thereof. Further, the techniques may involve configuration of the time or phase offset based on a class associated with a channel property or a CSI reference signal (CSI-RS) transmission and may be used to improve CSI derivation and feedback.

A method of wireless communication is described. The method may include receiving, from a base station, a control message comprising at least one CSI configuration parameter, identifying, by a UE, a time offset between a plurality of virtual antennas of the base station based at least in part on the at least one CSI configuration parameter, performing, by the UE, measurements of a plurality of CSI-RSs associated with the plurality of virtual antennas of the base station, and transmitting, to the base station, a feedback message based at least in part on the identified time offset and the measurements of the plurality of CSI-RSs.

An apparatus for wireless communication is described. The apparatus may include means for receiving, from a base station, a control message comprising at least one CSI configuration parameter, means for identifying, by a UE, a time offset between a plurality of virtual antennas of the base station based at least in part on the at least one CSI configuration parameter, means for performing, by the UE, measurements of a plurality of CSI-RSs associated with the plurality of virtual antennas of the base station, and means for transmitting, to the base station, a feedback message based at least in part on the identified time offset and the measurements of the plurality of CSI-RSs.

Another apparatus for wireless communication is described. The apparatus may include a processor, memory in electronic communication with the processor, and instructions stored in the memory. The instructions may be operable to cause the processor to receive, from a base station, a control message comprising at least one CSI configuration parameter, identify, by a UE, a time offset between a plurality of virtual antennas of the base station based at least in part on the at least one CSI configuration parameter, perform, by the UE, measurements of a plurality of CSI-RSs associated with the plurality of virtual antennas of the base station, and transmit, to the base station, a feedback message based at least in part on the identified time offset and the measurements of the plurality of CSI-RSs.

A non-transitory computer readable medium for wireless communication is described. The non-transitory computer-readable medium may include instructions operable to cause a processor to receive, from a base station, a control message comprising at least one CSI configuration parameter, identify, by a UE, a time offset between a plurality of virtual antennas of the base station based at least in part on the at least one CSI configuration parameter, perform, by the UE, measurements of a plurality of CSI-RSs associated with the plurality of virtual antennas of the base station, and transmit, to the base station, a feedback message based at least in part on the identified time offset and the measurements of the plurality of CSI-RSs.

In some examples of the method, apparatus, and non-transitory computer-readable medium described above, identifying the time offset comprises: calculating the time offset based at least in part on the at least one CSI configuration parameter.

In some examples of the method, apparatus, and non-transitory computer-readable medium described above, transmitting the feedback message further comprises: transmitting an initial co-phase vector between the plurality of virtual antennas of the base station.

In some examples of the method, apparatus, and non-transitory computer-readable medium described above, identifying the time offset comprises: receiving an indication of a time offset configuration from the base station, the time offset configuration determined by one of a core network node or the base station.

In some examples of the method, apparatus, and non-transitory computer-readable medium described above, the indication may be received via DCI or a radio resource control (RRC) message.

Some examples of the method, apparatus, and non-transitory computer-readable medium described above may further include processes, features, means, or instructions for computing CSI feedback for at least one CSI-RS based at least in part on the time offset configuration, wherein the feedback message includes the computed CSI feedback.

In some examples of the method, apparatus, and non-transitory computer-readable medium described above, the control message comprises DCI from the base station, the DCI comprising the at least one CSI configuration parameter.

In some examples of the method, apparatus, and non-transitory computer-readable medium described above, a format of the DCI comprises at least one of a special DCI format or a DCI format for CSI-RS.

In some examples of the method, apparatus, and non-transitory computer-readable medium described above, the DCI may be for the UE or a group of UEs including the UE.

In some examples of the method, apparatus, and non-transitory computer-readable medium described above, the control message comprises an RRC message comprising the at least one CSI configuration parameter.

Some examples of the method, apparatus, and non-transitory computer-readable medium described above may further include processes, features, means, or instructions for determining a fixed value of the time offset for use in performing the measurements, wherein the feedback message may be based at least in part on the fixed value of the time offset.

In some examples of the method, apparatus, and non-transitory computer-readable medium described above, determining the time offset comprises: selecting the time offset from a set of time offset candidates based at least in part on the measurements of the plurality of CSI-RSs.

In some examples of the method, apparatus, and non-transitory computer-readable medium described above, the time offset candidates may be determined based at least in part on the control message.

Some examples of the method, apparatus, and non-transitory computer-readable medium described above may further include processes, features, means, or instructions for determining, based at least in part on the time offset, at least one CSI parameter from a group consisting of: a rank indicator (RI), an initial co-phase indicator, a precoder matrix indicator (PMI), and a channel quality indicator (CQI), wherein the determined at least one CSI parameter may be included in the feedback message.

Some examples of the method, apparatus, and non-transitory computer-readable medium described above may further include processes, features, means, or instructions for selecting, based on a determination that the time offset equals 0 or a determination that a selected CSI resource corresponds to the time offset equal to 0, a closed loop transmission scheme procedure for transmitting the feedback message.

A method of wireless communication is described. The method may include receiving a first CSI-RS of a plurality of CSI-RSs over a first set of resources corresponding to a first beam and a first delay offset, determining a first CSI parameter based at least in part on the first CSI-RS, and transmit, to the base station, a feedback message based at least in part on the determined first CSI parameter.

An apparatus for wireless communication is described. The apparatus may include means for receiving a first CSI-RS of a plurality of CSI-RSs over a first set of resources corresponding to a first beam and a first delay offset, means for determining a first CSI parameter based at least in part on the first CSI-RS, and means for transmitting, to the base station, a feedback message based at least in part on the determined first CSI parameter.

Another apparatus for wireless communication is described. The apparatus may include a processor, memory in electronic communication with the processor, and instructions stored in the memory. The instructions may be operable to cause the processor to receive a first CSI-RS of a plurality of CSI-RSs over a first set of resources corresponding to a first beam and a first delay offset, determine a first CSI parameter based at least in part on the first CSI-RS, and transmit, to the base station, a feedback message based at least in part on the determined first CSI parameter.

A non-transitory computer readable medium for wireless communication is described. The non-transitory computer-readable medium may include instructions operable to cause a processor to receive a first CSI-RS of a plurality of CSI-RSs over a first set of resources corresponding to a first beam and a first delay offset, determine a first CSI parameter based at least in part on the first CSI-RS, and transmit, to the base station, a feedback message based at least in part on the determined first CSI parameter.

Some examples of the method, apparatus, and non-transitory computer-readable medium described above may further include processes, features, means, or instructions for receiving a second CSI-RS of the plurality of CSI-RSs over a second set of resources corresponding to a second beam and a second delay offset. Some examples of the method, apparatus, and non-transitory computer-readable medium described above may further include processes, features, means, or instructions for determining a second CSI parameter based at least in part on the second CSI-RS. Some examples of the method, apparatus, and non-transitory computer-readable medium described above may further include processes, features, means, or instructions for transmitting, to the base station, the feedback message based at least in part on the determined the second CSI parameter.

In some examples of the method, apparatus, and non-transitory computer-readable medium described above, the feedback message comprises at least one of a CSI Resource Indicator (CRI), an RI, a PMI, an initial co-phase indicator, a CQI, or a combination thereof.

Some examples of the method, apparatus, and non-transitory computer-readable medium described above may further include processes, features, means, or instructions for selecting a closed loop transmission scheme procedure for transmitting the feedback message.

A method of wireless communication is described. The method may include transmitting, by a base station, a control message comprising at least one CSI configuration parameter and a request to report a time offset between a plurality of virtual antennas of the base station and measurements of a plurality of CSI-RSs associated with the plurality of virtual antennas of the base station and receiving, from a UE and in response to the request, a feedback message based at least in part on the time offset and the measurements of the plurality of CSI-RSs.

An apparatus for wireless communication is described. The apparatus may include means for transmitting, by a base station, a control message comprising at least one CSI configuration parameter and a request to report a time offset between a plurality of virtual antennas of the base station and measurements of a plurality of CSI-RSs associated with the plurality of virtual antennas of the base station and means for receiving, from a UE and in response to the request, a feedback message based at least in part on the time offset and the measurements of the plurality of CSI-RSs.

Another apparatus for wireless communication is described. The apparatus may include a processor, memory in electronic communication with the processor, and instructions stored in the memory. The instructions may be operable to cause the processor to transmit, by a base station, a control message comprising at least one CSI configuration parameter and a request to report a time offset between a plurality of virtual antennas of the base station and measurements of a plurality of CSI-RSs associated with the plurality of virtual antennas of the base station and receive, from a UE and in response to the request, a feedback message based at least in part on the time offset and the measurements of the plurality of CSI-RSs.

A non-transitory computer readable medium for wireless communication is described. The non-transitory computer-readable medium may include instructions operable to cause a processor to transmit, by a base station, a control message comprising at least one CSI configuration parameter and a request to report a time offset between a plurality of virtual antennas of the base station and measurements of a plurality of CSI-RSs associated with the plurality of virtual antennas of the base station and receive, from a UE and in response to the request, a feedback message based at least in part on the time offset and the measurements of the plurality of CSI-RSs.

Some examples of the method, apparatus, and non-transitory computer-readable medium described above may further include processes, features, means, or instructions for transmitting, to the UE, an indication of a time offset configuration, the time offset configuration determined by one of a core network node or the base station.

In some examples of the method, apparatus, and non-transitory computer-readable medium described above, the indication may be transmitted via DCI, an RRC message, or within the control message.

In some examples of the method, apparatus, and non-transitory computer-readable medium described above, the feedback message includes CSI feedback for at least one CSI-RS of the plurality of CSI-RSs based at least in part on the time offset configuration.

Some examples of the method, apparatus, and non-transitory computer-readable medium described above may further include processes, features, means, or instructions for configuring a set of time offset candidates for the UE, wherein the control message includes the set of time offset candidates.

Some examples of the method, apparatus, and non-transitory computer-readable medium described above may further include processes, features, means, or instructions for receiving, from the UE, a UE time offset and at least one CSI parameter based at least in part on the UE time offset, wherein the at least one CSI parameter may be included in the feedback message.

Some examples of the method, apparatus, and non-transitory computer-readable medium described above may further include processes, features, means, or instructions for receiving, from the UE, at least one CSI parameter based at least in part on a fixed time offset, wherein the at least one CSI parameter may be included in the feedback message.

A method of wireless communication is described. The method may include transmitting, to a UE, a first CSI-RS of a plurality of CSI-RSs over a first set of resources corresponding to a first beam and a first delay offset and receiving, from the UE, a feedback message that includes a first CSI parameter, wherein the first CSI parameter is based at least in part on the first CSI-RS.

An apparatus for wireless communication is described. The apparatus may include means for transmitting, to a UE, a first CSI-RS of a plurality of CSI-RSs over a first set of resources corresponding to a first beam and a first delay offset and means for receiving, from the UE, a feedback message that includes a first CSI parameter, wherein the first CSI parameter is based at least in part on the first CSI-RS.

Another apparatus for wireless communication is described. The apparatus may include a processor, memory in electronic communication with the processor, and instructions stored in the memory. The instructions may be operable to cause the processor to transmit, to a UE, a first CSI-RS of a plurality of CSI-RSs over a first set of resources corresponding to a first beam and a first delay offset and receive, from the UE, a feedback message that includes a first CSI parameter, wherein the first CSI parameter is based at least in part on the first CSI-RS.

A non-transitory computer readable medium for wireless communication is described. The non-transitory computer-readable medium may include instructions operable to cause a processor to transmit, to a UE, a first CSI-RS of a plurality of CSI-RSs over a first set of resources corresponding to a first beam and a first delay offset and receive, from the UE, a feedback message that includes a first CSI parameter, wherein the first CSI parameter is based at least in part on the first CSI-RS.

Some examples of the method, apparatus, and non-transitory computer-readable medium described above may further include processes, features, means, or instructions for transmitting, to the UE, a second CSI-RS of the plurality of CSI-RSs over a second set of resources corresponding to a second beam and a second delay offset, wherein the feedback message includes a second CSI parameter based at least in part on the second CSI-RS.

DETAILED DESCRIPTION

Figure 1:
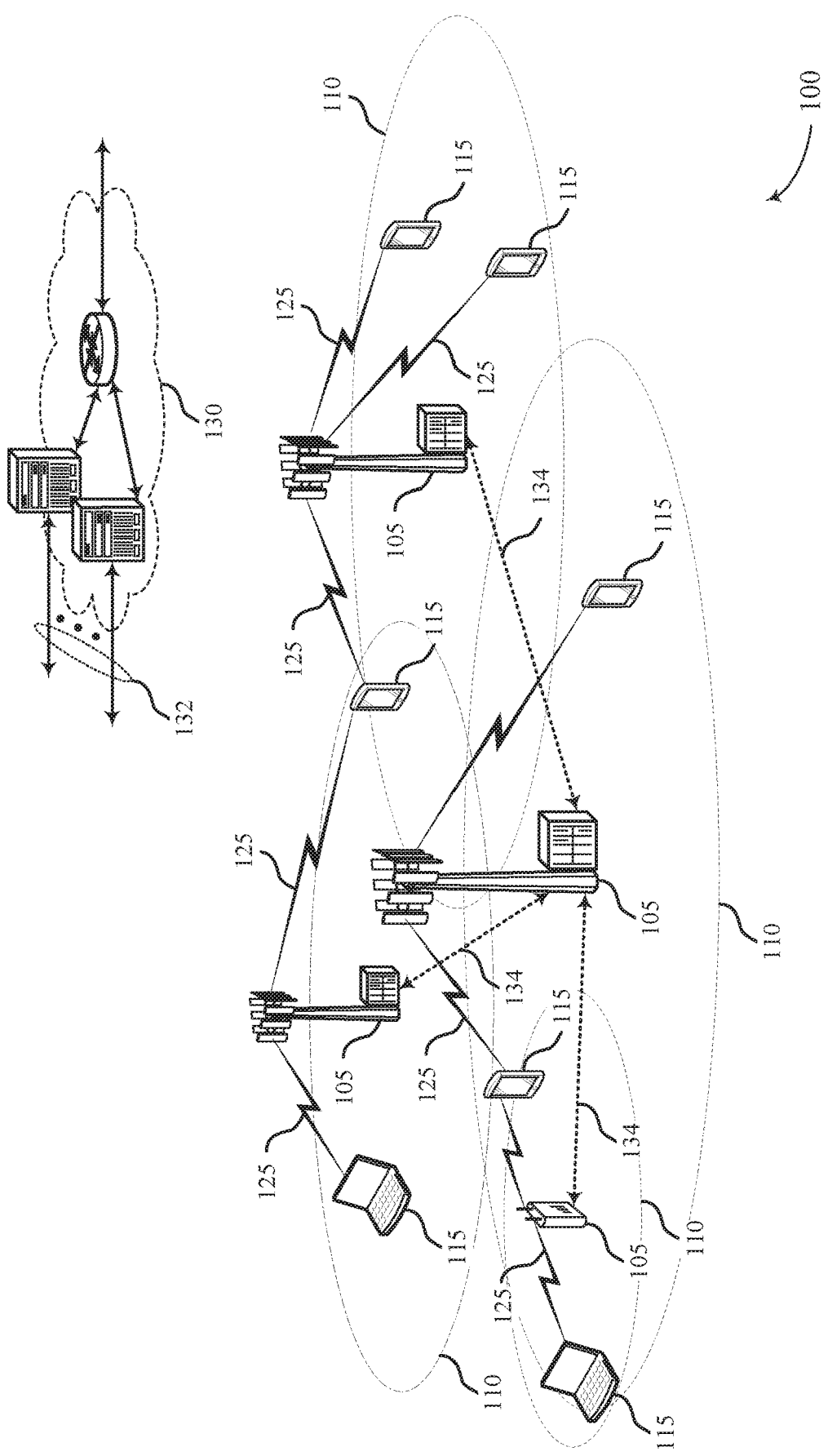
FIG. 1 illustrates an example of a wireless communications system that supports communication schemes for small cyclic delay diversity (SCDD) reference signals in accordance with aspects of the present disclosure.

Because of the lossy channels in wireless communication systems, a transmitting device, such as a base station, may employ small cyclic delay diversity (SCDD) to mitigate path loss. SCDD introduces a time offset between a first signal transmitted by a first virtual antenna and a second signal transmitted by a second virtual antenna. In some cases, the time offset may be denoted by T, and the virtual antennas may each be beamformed transmissions performed by one or more physical antennas. Further, the beamformed transmissions may be formed by more than two virtual antennas, each of which may be associated with an individual virtual antenna index (e.g., 0, 1, 2, 3, . . . ). In such instances, SCDD may introduce a first time offset (e.g., $\tau_0$) between a first signal transmitted by the first virtual antenna (virtual antenna index 0) and a second signal transmitted by the second virtual antenna (virtual antenna index 1), a second offset (e.g., $\tau_1$) between the second signal transmitted by the second virtual antenna (virtual antenna index 1) and a third signal transmitted by the third virtual antenna (virtual antenna index 2), and so on. In some cases, the multiple time offsets (e.g., $\tau_0$, $\tau_1$, . . . ) introduced between the virtual antennas may be the same or different. In some systems, increasing the number of antennas at a base station may be less complex than at a user equipment (UE) (e.g., due to size and power constraints). In such instances, when a base station supports more physical antennas than a UE, the base station may map a relatively large number of physical antennas to a smaller number of virtual antennas and may utilize SCDD during transmission of one or more signals to the UE.

The time offset introduced by SCDD may result in a phase offset in frequency tones. To accurately derive a Channel Quality Indicator (CQI), it may be beneficial for a UE to be aware of the phase offset. Further, the phase offset may be flexibly chosen (e.g., by the base station) based at least in part on a transmission configuration or may be adjusted based on channel conditions, UE capabilities, etc. In some examples, it may be desirable to align the Channel State Information (CSI) feedback mechanism for SCDD with the CSI feedback designed for transmission as closely as possible so the UE may determine the time offset between multiple virtual antennas of the base station. The time offset may be indicated to the UE from a base station or other network node or the UE may calculate the time offset based on a control message received from the base station. The UE may also perform measurements of multiple CSI reference signals (RSs) transmitted from the base station. Using the determined time offset along with the measurements, the UE may transmit a feedback message to the base station.

Aspects of the disclosure are initially described in the context of a wireless communications system. Aspects are then described with respect to process flows. Aspects of the disclosure are further illustrated by and described with reference to apparatus diagrams, system diagrams, and flowcharts that relate to CSI feedback designs for SCDD.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. In the wireless communications system 100, a base station 105 may employ SCDD which may involve introducing a time or phase offset between RSs transmitted using multiple antenna ports of the base station 105. A UE 115 may receive the RSs and perform measurements of the RSs to provide feedback to the base station 105. In some instances, the UE 115 may determine or receive an indication of the time offset (e.g., from base station 105), which may be used to determine one or more CSI parameters. The one or more CSI parameters may be transmitted in the feedback message to the UE 115.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a network device such as a base station 105 or core network 130 supporting radio bearers for user plane data. At the Physical (PHY) layer, transport channels may be mapped to physical channels.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Figure 2:
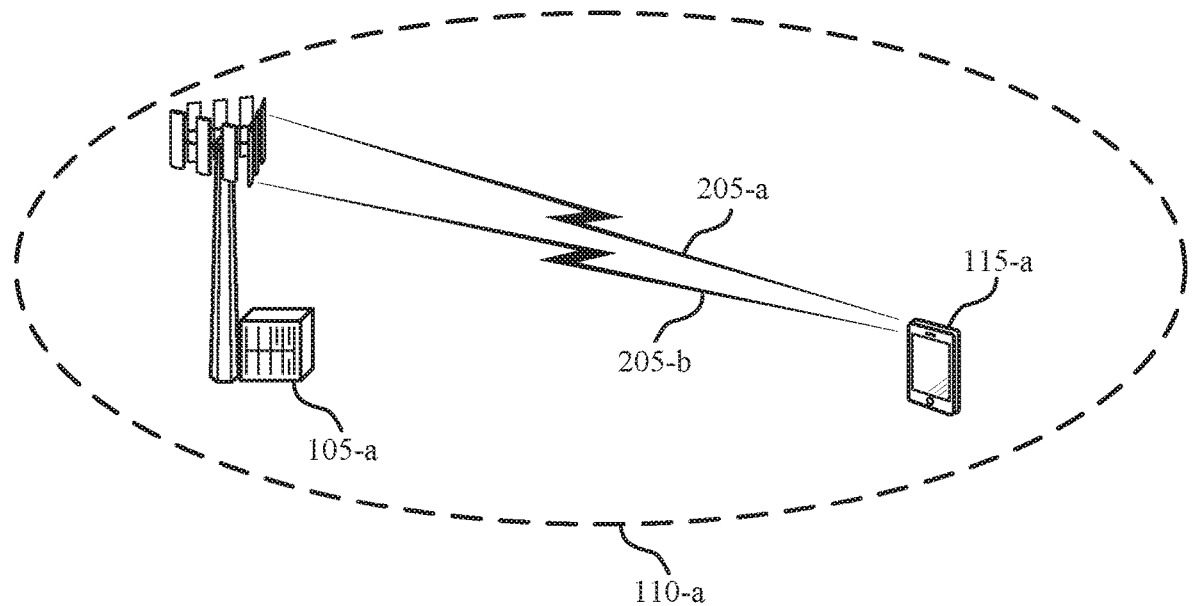
FIG. 2 illustrates an example of a wireless communications system that supports communication schemes for SCDD reference signals in accordance with aspects of the present disclosure.

FIG. 2 illustrates an example of a wireless communications system 200 that supports communication schemes for SCDD reference signals in accordance with various aspects of the present disclosure. In some examples, wireless communications system 200 may implement aspects of wireless communications system 100. The wireless communications system 200 may include a UE 115-a and a base station 105-a, which may be examples of the UE 115 and base station 105 described with reference to FIG. 1. Base station 105-a may transmit one or more signals through one or more virtual antennas to UE 115-a within geographic coverage area 110-a. In some cases, wireless communications system 200 may deploy MIMO technology.

In some cases, because of the lossy channels in wireless communication systems, base station 105-a may employ SCDD to optimize path loss and enable wideband channel estimation to accurately estimate channel quality. Path loss may be introduced due to communication with a high mobility UE 115-a. The SCDD introduces a time offset, τ, between a first signal transmitted by a first virtual antenna (antenna 0) and a second signal transmitted by a second virtual antenna (antenna 1). In some cases, signals transmitted through the one or more virtual antennas may follow different paths 205 (e.g., path 205-a, and path 205-b) and the time offset introduced by SCDD may result in phase offset in frequency tones. According to some aspects, the phase change in a tone 'k' may be based at least in part on: the tone 'k', τ, and the subcarrier spacing (Δf). For example, the phase change in tone 'k' may be:

$$k\Delta\theta, \text{ where: } \Delta\theta = 2 \times \pi \times \tau \times \Delta f.$$

The transmitted signal in tone k may be denoted by:

$$x(k) = \begin{bmatrix} b & 0 \\ 0 & b \end{bmatrix} \times D(k) \times U \times s_k$$

where:

$$D(k) = \begin{bmatrix} 1 & 0 \\ 0 & \exp(jk\Delta\theta) \end{bmatrix} \text{ and } U = \begin{bmatrix} 1 \\ 1 \end{bmatrix}$$

In a first scheme, the SCDD deployed may be based on Pre-coding Matrix Indicator (PMI) feedback. In such a scheme, the transmission scheme may be designed as described below. It should be noted, however, that other implementations of the transmission scheme may be considered without departing from the scope of the present disclosure.

In some cases, the layer (e.g., upper layers such as MAC, Network, Transport, etc.) to virtual antenna mapping matrix (denoted by U) may be formed by an initial phase '$\theta_{ini}$'. Further, the final phase applied in each tone may be jointly determined by D(k) and U. As previously described, the matrix D(k) may comprise an indication of the phase offset for the second virtual antenna (antenna 1) as compared to the first virtual antenna (antenna 0). In some cases, U or $\theta_{ini}$ may be determined based on UE subband feedback. For example, for dual-stage codebook, there may be 4 phase value candidates indicated by the UE subband feedback, by i2 as follows:

$$\begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -1 \end{bmatrix}$$

In some other cases, the phase value may have 8 candidates. These in turn may be denoted by:

$$\begin{bmatrix} 1 \\ \exp\left(\frac{j\pi}{4}n\right) \end{bmatrix},$$

where n=0, 1, 2, . . . 7. In some cases, 'U' may be determined based on channel reciprocity and D(k) may be determined based at least in part on UE feedback, which may include a CSI resource (CRI) or a quantization of the time offset τ (e.g., 0, 0.2, 0.4, 0.8 microseconds). Further, in some instances, the base station 105-a may be configured to determine or select D(k) and U (e.g., based on an indication from an upper layer node or from UE feedback).

In some cases, the base station 105-a may determine a classification (e.g., class A, class B, hybrid, etc.) for transmission of one or more CSI-RS as well as a set of resources to be used for transmission of the CSI-RS. In some examples, the classification may be used to determine the set of resources for transmission of the CSI-RS (e.g., to the UE 115-a). The base station 105-a may also determine one or more precoders, which may differ between antenna ports of the base station.

In some examples, the base station 105-a may determine a feedback type for the UE 115-a, which may include and a list of parameters for the UE 115-a to consider when providing feedback. For instance, the base station 105-a (or other network node) may configure the UE 115-a to provide feedback for one or more of: CRI, Rank Indicator (RI), PMI, CQI, etc. In some cases, the base station 105-a may determine the time offset configuration applied during SCDD, as well as a closed-loop or semi open-loop switching mode. The closed-loop mode may request that the UE 115-a explicitly provide feedback information about the channel in order to assist the base station 105-a in choosing a transmission scheme for the multiple antennas. In other cases, an open or semi-open loop mode may not involve an explicit channel feedback from the UE 115-a.

In some examples, the base station 105-a may indicate information pertaining to the CSI-RS class and resources, feedback type and content, timing offset configuration applied in SCDD, closed or semi-open loop switching mode, or any other CSI-RS configuration related information to the UE 115-a dynamically (e.g., via Downlink Control Information (DCI)) or semi-statically (e.g., via Radio Resource Configuration (RRC)). In some cases, the base station 105-a may modify the DCI by embedding the time offset in a DCI format for CSI-RS or may use a DCI format designed to indicate the time offset.

Following determination of a CSI-RS configuration, the base station 105-a may then proceed to transmit the CSI-RS signals according to the configuration. In some cases, the UE 115-a may receive the one or more CSI-RS signals and may subsequently proceed to measure the channel. Based on the measurement and the time offset, the UE 115-a may derive one or more CSI parameters and may determine the selected time offset (e.g., zero or non-zero) for SCDD.

According to various aspects, the time offset indication for CSI derivation may be network configured, UE configured, or a combination. In some cases, the time offset indication for CSI derivation may be configured by the base station 105-a with class A CSI-RS. In some examples, for a Class A CSI reporting class, the UE 115-a may report CSI according to a codebook based on CSI-RS ports. For instance, the codebook may be known to the UE 115-a or the UE 115-a may be informed of which codebook to use (e.g., via signaling such as RRC signaling). In some instances, for CSI reporting class A, each of the one or more antenna elements of the base station 105-a may transmit a unique CSI-RS per polarization. Also for class A CSI reporting, the base station 105-a may configure the time offset based on a channel property, such as delay spread. The delay spread may arise due to the multipath nature of a communication channel. For example, there may be an arrival time difference between the line-of-sight (LOS) component of a channel arriving at the UE 115-a, and the multipath component (e.g., after reflecting off buildings) of the channel. In some cases, the base station 105-a may indicate to the UE 115-a the time offset together with the CSI-RS configuration signaling. As previously described, the base station 105-a may provide an indication of the information pertaining to the CSI-RS class and resources, and timing offset configuration dynamically (e.g., via DCI) or semi-statically (e.g., via RRC). Following receiving an indication of the timing offset and the CSI-RS configuration signaling from the base station 105-a, the UE 115-a may proceed to compute one or more of: RI, PMI, CQI, etc. In some cases, a timing offset (or $\tau$)=0 may imply a CSI derivation for a closed-loop transmission scheme.

In another example of network configured time offset indication for CSI, the time offset indication for CSI derivation may be configured by the network with K=1 Class B or hybrid CSI-RS. In some examples, for a class B or hybrid CSI reporting class, the UE 115-a may report on multiple beam-formed CSI reference signals. In some cases, one or more CSI-RS resources may be configured in the UE 115-a, where each CSI-RS resource may consist of one or more antenna ports per beam. In some examples of a network configured time offset for class B or hybrid CSI reporting, the base station 105-a may configure a CSI-RS resource (K=1), and a time offset. Further, in such cases, the precoder of CSI-RS may be formed by a beam and the configured delay offset. Following receiving the CSI-RS from the base station 105-a, the UE 115-a may proceed to compute and report RI, PMI, and CQI. In some cases, the UE 115-a may not need to know the value of the delay offset, by virtue of the CSI-RS precoder being formed by a beam and the delay offset. In some cases, a timing offset (or $\tau$)=0 may imply a CSI derivation for a closed-loop transmission scheme.

In another example of time offset indication for CSI, a fixed time offset may be used with class A CSI-RS reporting. For example, a fixed time offset known to both the UE 115-a and the network or base station 105-a, or explicitly specified in the specification may be employed for deriving RI, PMI, and CQI.

In an example of UE selected or configured time offset indication with class A CSI-RS reporting, UE 115-a may select an optimum time offset from a set of timing offset candidates. For example, the candidates (e.g., 0 µs, 0.2 µs, 0.4 µs, 0.8 µs, etc.) may be fixed and explicitly specified to the UE 115-a. Further, in some cases, the UE 115-a may merely select from a set of candidates dynamically (DCI) or semi-statistically (RRC) configured by the network. Following receiving the CSI-RS from the network, the UE 115-a may proceed to derive the RI, PMI, and CQI, which may be dependent on the time offset previously chosen. The UE 115-a may then report the RI, PMI, and CQI to the base station 105-a. In some cases, a timing offset (or r)=0 may imply a CSI derivation for a closed-loop transmission scheme.

In another example of UE selected or configured time offset indication, the UE 115-a may utilize class B or hybrid CSI-RS reporting. In some cases, the network may configure two or more CSI-RS resources (K>1) for CSI reporting. In such cases, the precoder of CSI-RS in each resource may be formed by a beam and a chosen delay offset from a set of candidates (e.g., 0 µs, 0.2 µs, 0.4 µs, 0.8 µs, etc.) In some cases, each of the CSI-RS resources may be denoted or identified by a CSI-RS resource index (CRI). In some cases, the UE 115-a may report CRI, RI, PMI, and CQI associated with the CRI following receiving the CSI-RS from the network. In some cases, a timing offset (or $\tau$)=0 may imply a CSI derivation for a closed-loop transmission scheme In some cases, the UE 115-a may employ inner PMI (i.e., i2) as the initial phase when deriving CQI. In such cases, the reported i2 may be based at least in part on, or dependent on the time offset selected. Further, a zero time offset may imply a CSI report for a closed-loop transmission mode. In some cases, the reported i2 may be wideband, partial band, or subband specific.

Figure 3:
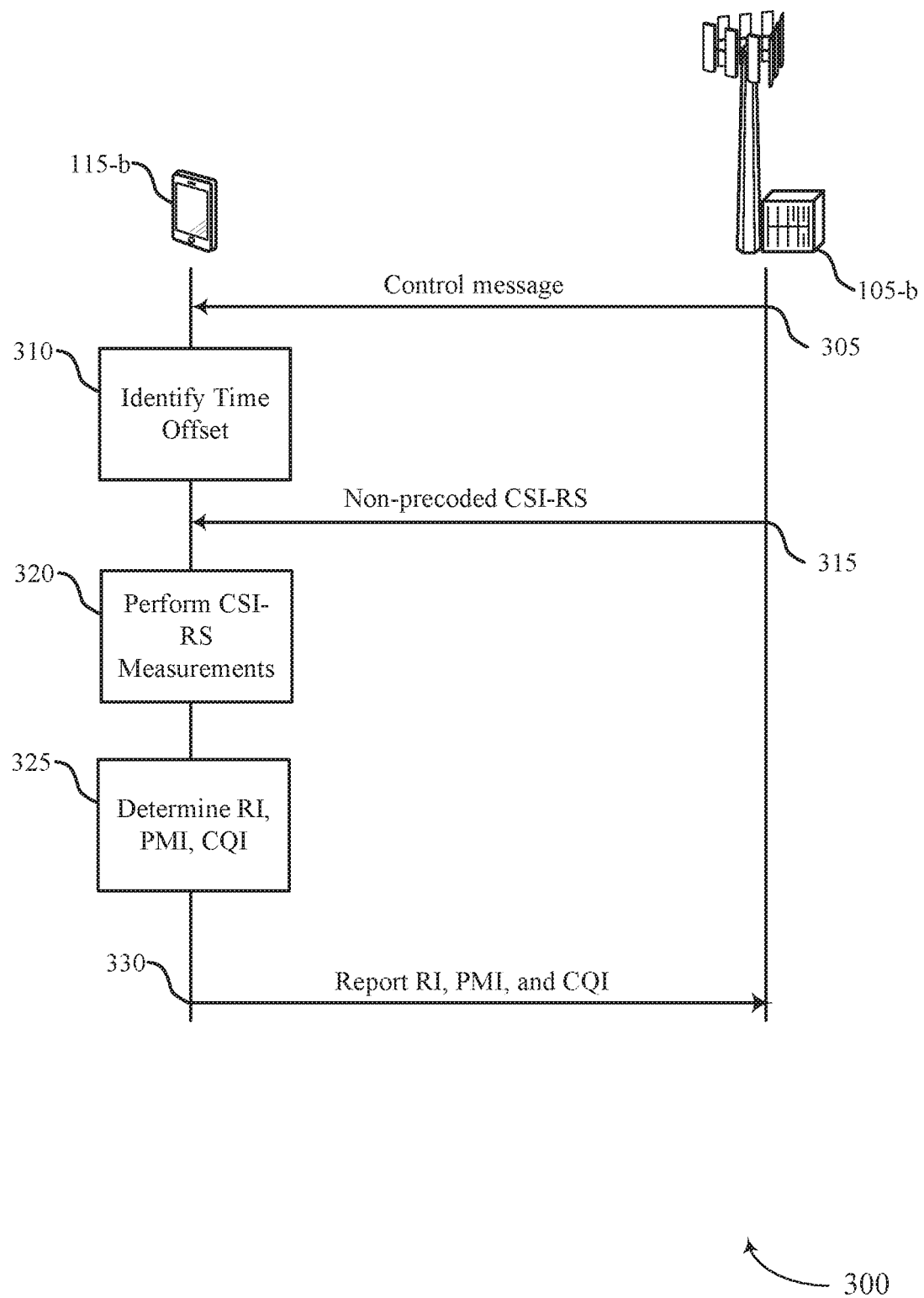
FIGS. 3 through 7 illustrate example process flows that support communication schemes for SCDD reference signals in accordance with aspects of the present disclosure.

FIG. 3 illustrates an example of a process flow 300 that supports communication schemes for SCDD reference signals in accordance with various aspects of the present disclosure. In some examples, process flow 300 may implement aspects of wireless communications systems 100 or 200, as described with reference to FIGS. 1 and 2. UE 115-b and base station 105-b may be examples of the corresponding devices described above with reference to FIGS. 1 and 2. Process flow 300 may be an example of a network configured time offset indication for CSI using non-precoded CSI-RS (e.g., Class A CSI-RS).

At 305, the UE 115-b may receive a control message from base station 105-b. In some cases, the control message may comprise a DCI or RRC message. In some examples, the DCI or RRC message may include at least one CSI configuration parameter.

At 310, the UE 115-b may identify a time offset between two or more virtual antennas of the base station. In some cases, the time offset may be identified based at least in part on the at least one CSI configuration parameter (e.g., as indicated by or included in the control message).

At 315, the UE 115-b may receive a first non-precoded CSI-RS of a plurality of CSI-RSs over a first set of resources associated with a first CSI configuration parameter. In some cases, the UE 115-b may also receive a second non-precoded CSI-RS of the plurality of CSI-RSs over a second set of resources associated with a second CSI configuration parameter. The first and second non-precoded CSI-RSs may be transmitted by the base station 105-b according to the at least one CSI configuration parameter.

At 320, the UE 115-b may perform CSI-RS measurements on at least one CSI-RS (e.g., the first CSI-RS, the second CSI-RS) of the plurality of CSI-RSs. In some examples, the UE 115-b may perform measurements on each of the plurality of CSI-RSs.

At 325, the UE 115-b may determine the at least one CSI parameter such as RI, PMI, CQI, etc. In some cases, the UE 115-b may determine RI, PMI, and/or CQI based on the time offset determined at 310. Further, in some examples, the at least one CSI parameter may be based at least in part on the first non-precoded CSI-RS or the second non-precoded CSI-RS received from the base station 105-b (e.g., as received in 315).

At 330, the UE 115-b may transmit a feedback message to the base station 105-b. The feedback message may be based at least in part on the time offset (e.g., as identified at 310) or the CSI-RS measurements (e.g. as performed at 320). In some cases, the UE 115-b may select a closed loop transmission scheme procedure for transmitting the feedback message to the base station 105-b (e.g., based on a determination that the time offset equals 0). Further, in some examples, the feedback message may include the at least one CSI parameter, such as RI, PMI, CQI, etc., as determined in 325.

Figure 4:
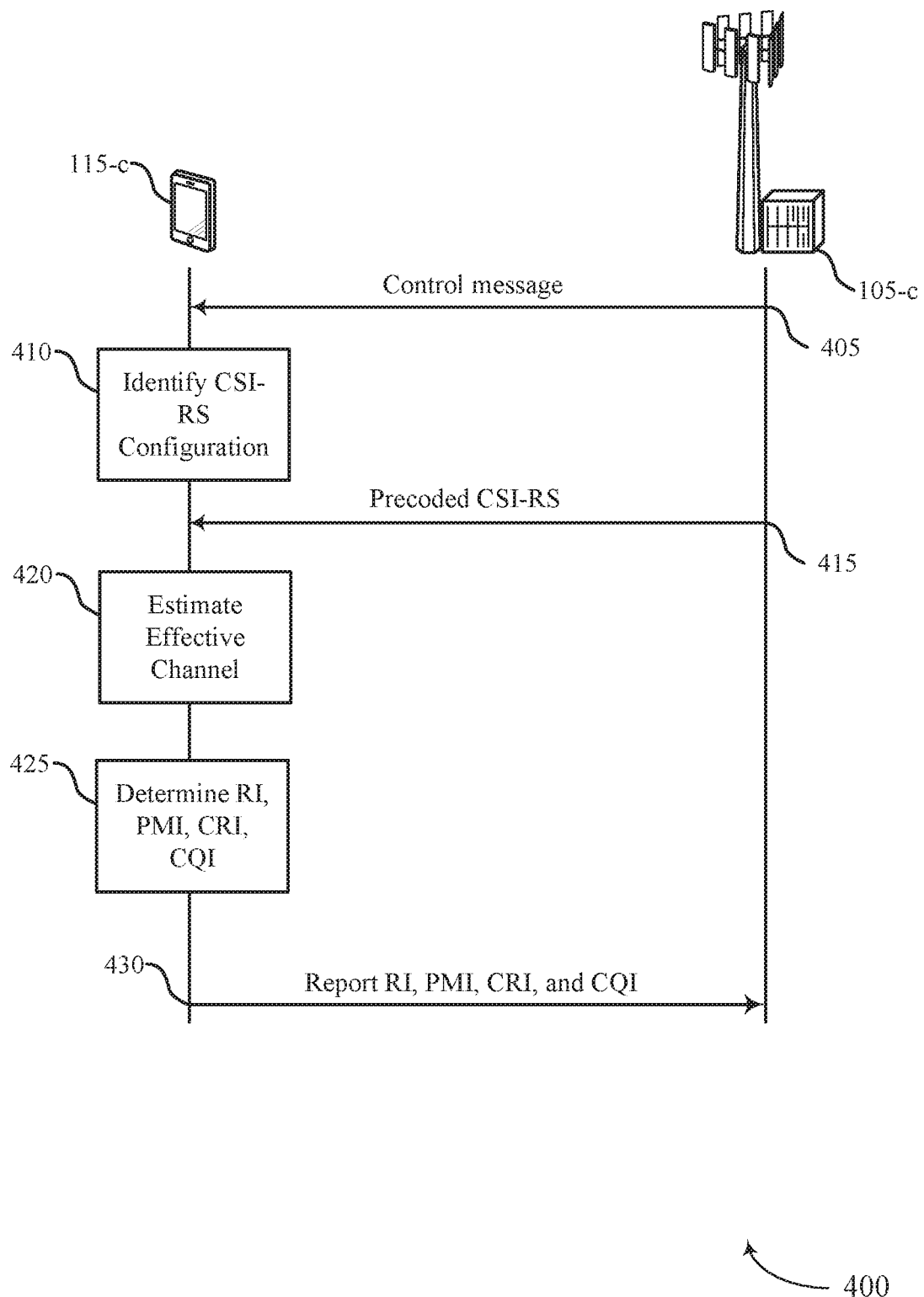

FIG. 4 illustrates an example of a process flow 400 that supports communication schemes for SCDD reference signals in accordance with various aspects of the present disclosure. In some examples, process flow 400 may implement aspects of wireless communications systems 100 or 200 as described with reference to FIGS. 1 and 2. UE 115-c and base station 105-c may be examples of the corresponding devices described above with reference to FIGS. 1 and 2. Process flow 400 may be an example of a network configured time offset indication for CSI using precoded CSI-RS (e.g., Class B CSI-RS).

At 405, the UE 115-c may receive a control message from base station 105-c. In some cases, the control message may comprise a DCI or RRC message. In some examples, the DCI or RRC message may include at least one CSI configuration parameter.

At 410, the UE 115-c may identify a CSI-RS configuration. The CSI-RS may be identified based at least in part on the control message and in some cases may be determined based at least in part on the at least one CSI configuration parameter. In some examples, a network entity (e.g., a core network node or base station 105-c) may configure precoded CSI-RS resources for CSI-RS reporting.

At 415, the UE 115-c may receive one or more precoded CSI-RSs from the base station 105-c. In such cases, the precoder for CSI-RS of each resource may be formed by a beam and a delay offset selected from a set of candidates (e.g., 0 μs, 0.2 μs, 0.4 μs, 0.8 μs).

At 420, the UE 115-c may estimate an effective channel. In some cases, the UE 115-c may perform CSI-RS measurements on one or more CSI-RSs transmitted by the base station 105-c, which may be used to estimate the effective channel.

At 425, the UE 115-c may determine at least one CSI parameter (e.g., RI, PMI, CRI, CQI). In some examples, the at least one CSI parameter may be determined based at least in part on the effective channel (e.g., as estimated at 420).

At 430, the UE 115-c may transmit a feedback message to the base station 105-c, which may be based at least in part on the CSI-RS measurements. In some cases, the reported CSI parameter may correspond to a closed loop transmission scheme (e.g., if the base station 105-c precodes the CSI-RS based a time offset that equals 0). In some examples, the feedback message may include the at least one CSI parameter, such as RI, PMI, CRI, CQI, etc.

Figure 5:
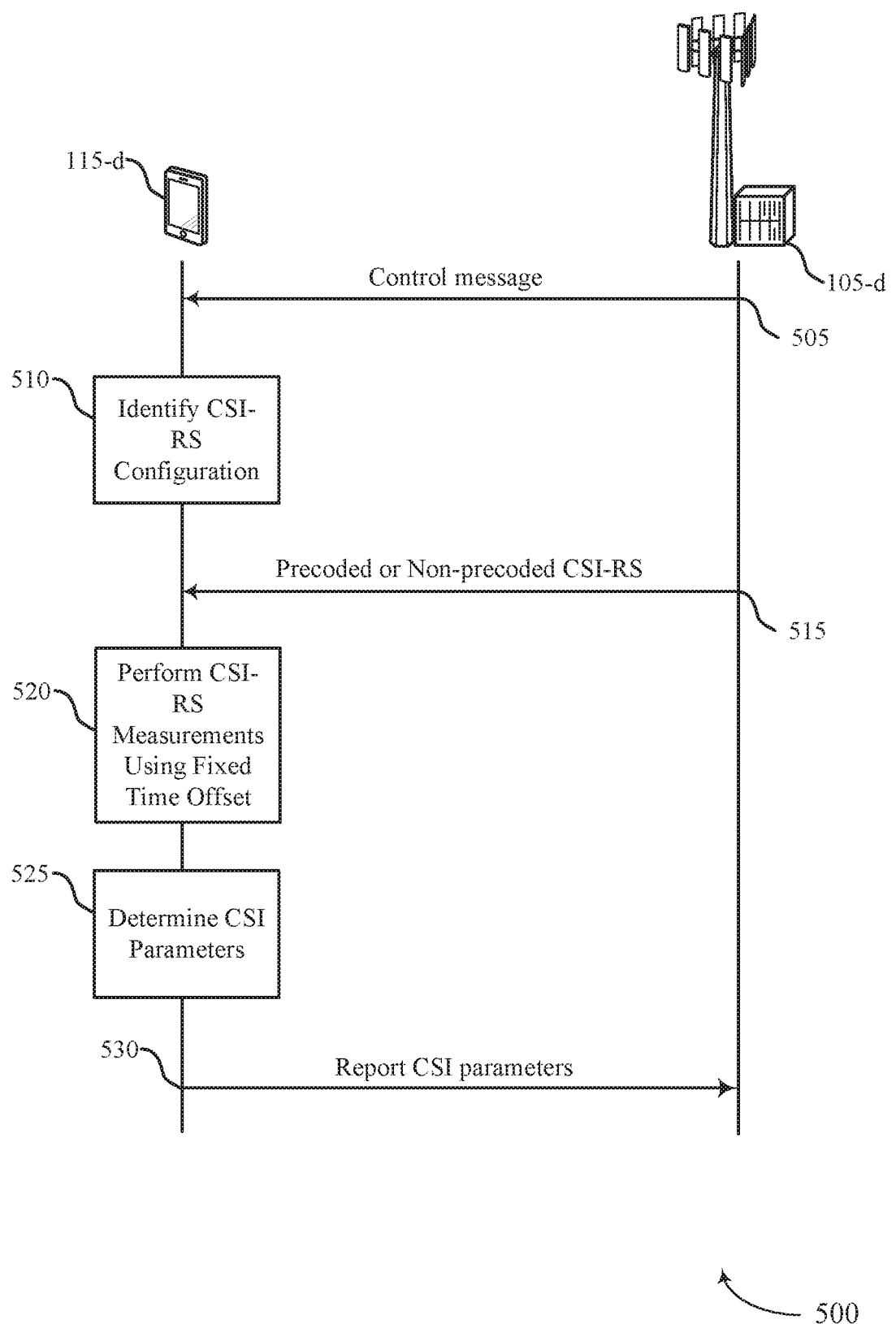

FIG. 5 illustrates an example of a process flow 500 that supports communication schemes for SCDD reference signals in accordance with various aspects of the present disclosure. In some examples, process flow 500 may implement aspects of wireless communications systems 100 or 200 as described with reference to FIGS. 1 and 2. UE 115-d and base station 105-d may be examples of the corresponding devices described above with reference to FIGS. 1 and 2. Process flow 500 may be an example of a network configured time offset indication for CSI, where a fixed time offset may be used for CSI reporting.

At 505, the UE 115-d may receive a control message from base station 105-d. In some cases, the control message may comprise a DCI or RRC message. In some examples, the DCI or RRC message may include at least one CSI configuration parameter.

At 510, the UE 115-d may identify a CSI-RS configuration. The CSI-RS may be identified based at least in part on the control message (e.g., the CSI-RS configuration may be indicated by or included in the control message). In some cases, the CSI-RS may be identified based at least in part on the at least one CSI configuration parameter. In some examples, a network entity (e.g., a core network node or base station 105-d) may configure precoded or non-precoded CSI-RS resources for CSI-RS reporting.

At 515, the UE 115-d may receive one or more CSI-RSs, which may be transmitted by base station 105-d. The one or more CSI-RSs may include precoded or non-precoded CSI-RSs, which may be received over corresponding sets of resources (e.g., as configured by a core network node or base station 105-d. In some examples, the one or more CSI-RSs may be transmitted by the base station 105-b according to the at least one CSI configuration parameter.

At 520, the UE 115-d may perform CSI-RS measurements on the at least one CSI-RSs received at 510. In some cases, a fixed time offset known to both the UE 115-*d* and the network or base station 105-*d* may be used for performing CSI-RS measurements.

At 525, the UE 115-*d* may determine at least one CSI parameter (e.g., RI, PMI, CRI, CQI). The at least one CSI parameter may be determined based on the CSI-RS measurements (e.g., as performed at 520).

At 530, the UE 115-*d* may transmit a feedback message to the base station 105-*d*. The feedback message may be reported to the base station 105-*d* and may be based at least in part on the CSI-RS measurements. In some examples, the feedback message may include at least one CSI parameter, such as RI, CRI PMI, CQI, etc., as determined at 525.

Figure 6:
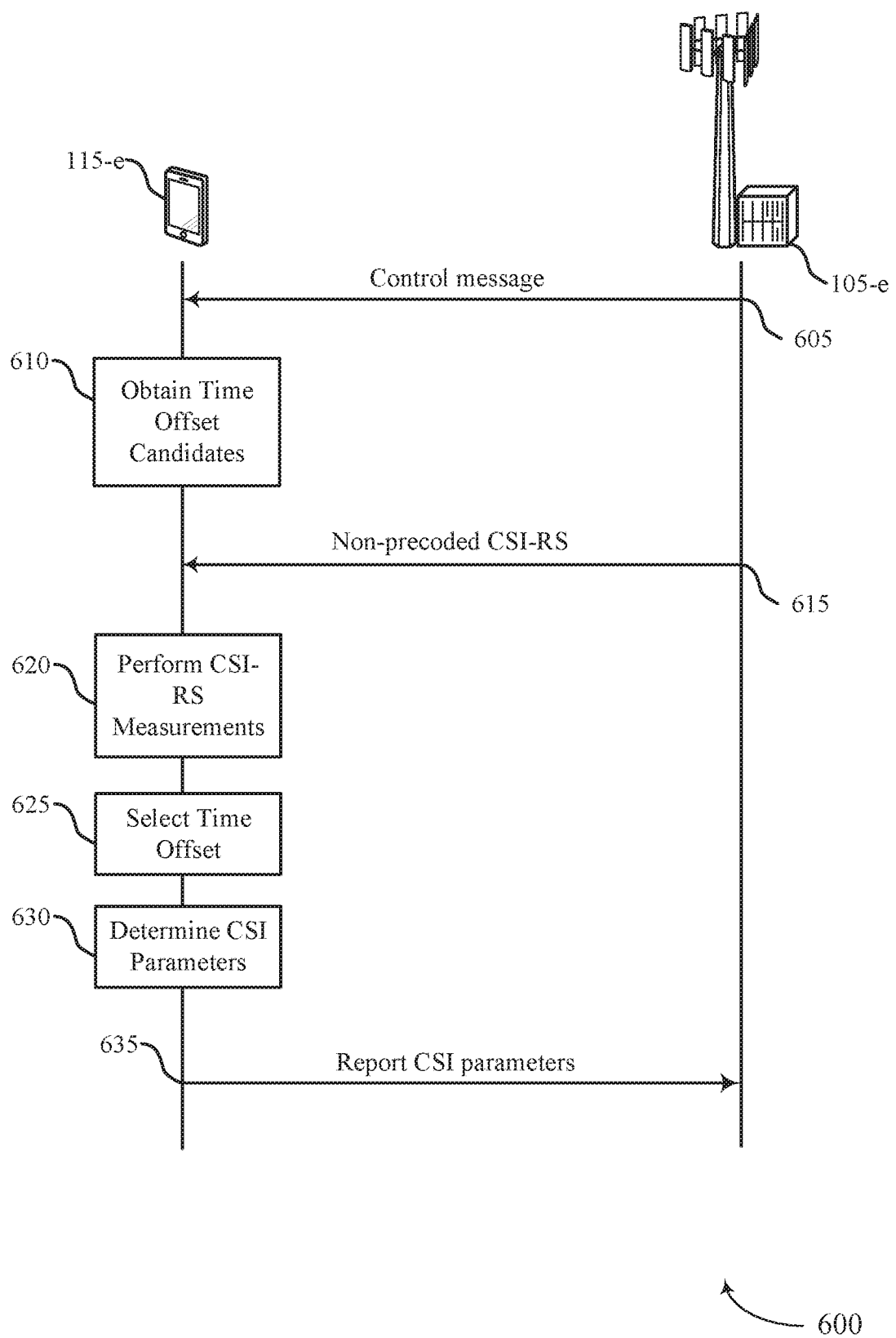

FIG. 6 illustrates an example of a process flow 600 that supports communication schemes for SCDD reference signals in accordance with various aspects of the present disclosure. In some examples, process flow 600 may implement aspects of wireless communications systems 100 or 200 as described with reference to FIGS. 1 and 2. UE 115-*e* and base station 105-*e* may be examples of the corresponding devices described above with reference to FIGS. 1 and 2. Process flow 600 may be an example of a network assisted UE determined time offset for CSI derivation using non-precoded CSI-RS.

At 605, the UE 115-*e* may receive a control message from base station 105-*e*. In some cases, the control message may comprise a DCI or RRC message. In some examples, the DCI or RRC message may include at least one CSI configuration parameter.

At 610, the UE 115-*e* may obtain a set of time offset candidates. The set of time offset candidates may be indicated by the control message (e.g., based on the at least one CSI configuration parameter), as received at 605. In some cases, the set of time offset candidates may be dynamically configured by the network or base station 105-*e* (e.g., via DCI). In some examples, the time offset candidates may be semi-statistically (RRC) configured by the network or base station 105-*e* (e.g., via RRC).

At 615, the UE 115-*e* may receive one or more non-precoded CSI-RSs over a set of resources, which may be associated with a CSI configuration parameter. The one or more CSI-RSs may be transmitted by the base station 105-*e*.

At 620, the UE 115-*e* may perform CSI-RS measurements on the at least one CSI-RS (e.g., as received from the base station 105-*e* at 615).

At 625, the UE 115-*e* may select a time offset from the set of time offset candidates obtained at 610. The UE 115-*e* may select a time offset by trying each time offset candidate (e.g., as obtained at 610) and determining the spectral efficiency for each time offset candidate. In some cases, the time offset associated with the highest spectral efficiency may be selected.

At 630, the UE 115-*e* may determine, based on the time offset selected at 625, at least one CSI parameter (e.g., RI, PMI, and/or CQI). In some examples, the at least one CSI parameter may be determined based on an association between the time offset (e.g., selected at 625) and a set of CSI parameters.

At 635, the UE 115-*e* may transmit a feedback message to the base station 105-*e*, which may be based at least in part on the time offset (e.g., as selected at 625) and the CSI-RS measurements (e.g., as determined at 630). In some cases, the UE 115-*e* may select a closed loop transmission scheme procedure for transmitting the feedback message to the base station 105-*e* (e.g., based on a time offset of 0). In some examples, the UE 115-*e* may report the at least one CSI parameter (e.g., RI, PMI, CQI) to the base station 105-*e* in the feedback message.

Figure 7:
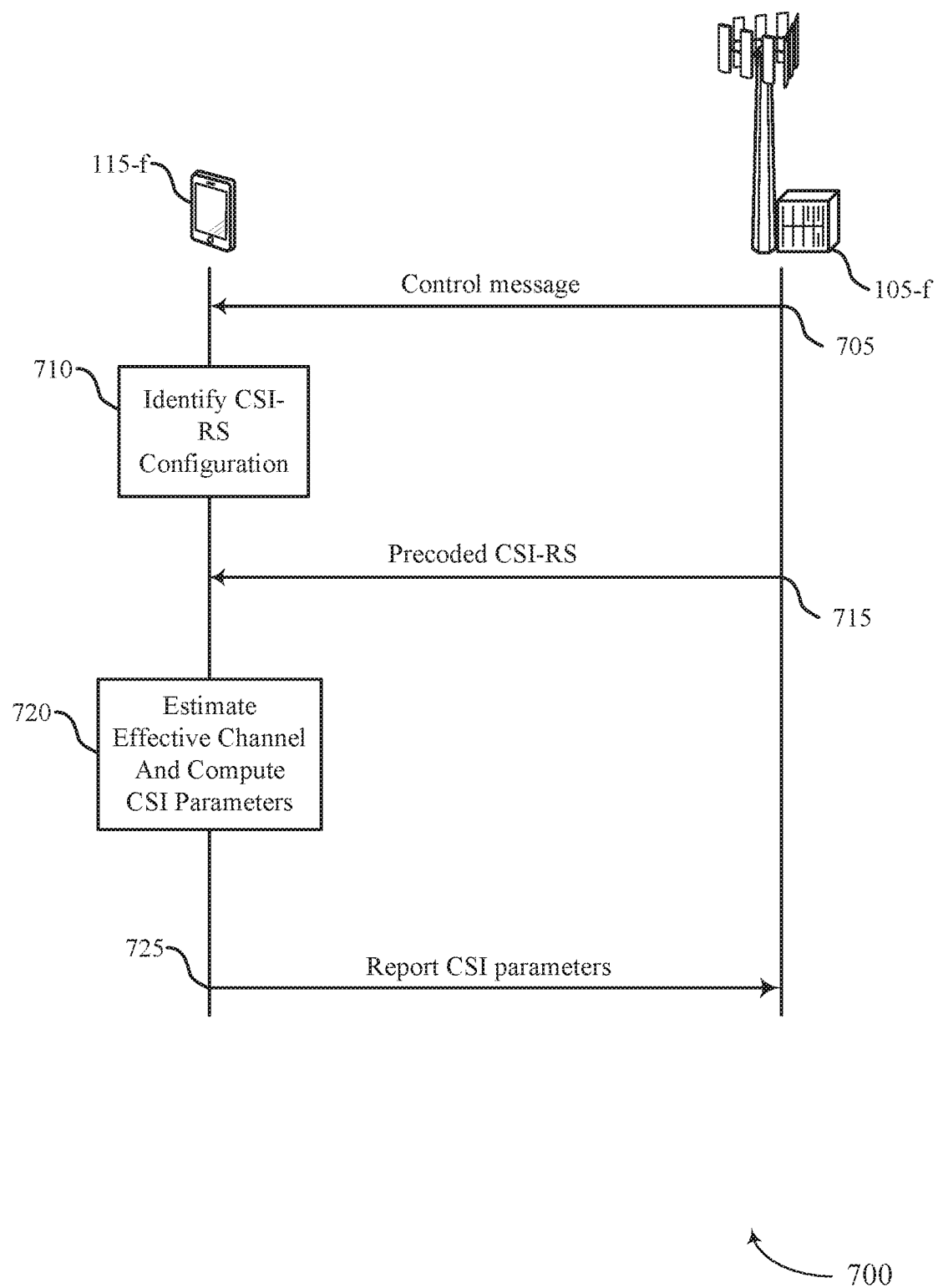

FIG. 7 illustrates an example of a process flow 700 that supports communication schemes for SCDD reference signals in accordance with various aspects of the present disclosure. In some examples, process flow 700 may implement aspects of wireless communications systems 100 or 200 as described with reference to FIGS. 1 and 2. UE 115-*f* and base station 105-*f* may be examples of the corresponding devices described above with reference to FIGS. 1 and 2. Process flow 700 may be an example of a network assisted UE determined time offset for CSI derivation using precoded CSI-RS.

At 705, the UE 115-*f* may receive a control message from base station 105-*f*. In some cases, the control message may comprise a DCI or RRC message. In some examples, the DCI or RRC message may include at least one CSI configuration parameter.

At 710, the UE 115-*f* may identify a CSI-RS configuration. The CSI-RS may be identified based at least in part on the control message and in some cases may be determined based at least in part on the at least one CSI configuration parameter.

At 715, the UE 115-*f* may receive one or more precoded CSI-RSs over a set of resources associated with a CSI configuration parameter. For instance, different precoders of base station 105-*f* may be associated with different sets of resources. The one or more CSI-RSs may be transmitted by the base station 105-*f*. In some cases, the base station 105-*f* may configure two or more CSI-RS resources for CSI reporting. In such cases, the precoder for CSI-RS in each resource may be formed by a beam and a specific time offset selected from a set of candidates (e.g., 0 μs, 0.2 s, 0.4 μs, 0.8 μs).

At 720, the UE 115-*f* estimate an effective channel. In some cases, the UE 115-*f* may perform CSI-RS measurements on one or more CSI-RSs transmitted by the base station 105-*f*, which may be used to estimate the effective channel. The UE 115-*f* may select a CSI-RS resource of the one or more precoded CSI-RS resources based on the measurements and compute one or more CSI parameters (e.g., CRI, RI, PMI, CQI) based at least in part on the selected CSI-RS. In some examples, the one or more CSI parameters may be computed based at least in part on the estimated effective channel. In some aspects, at least one CSI parameter may be based at least in part on the one or more precoded CSI-RSs received from the base station 105-*f* at 715.

At 720, the UE 115-*f* may transmit a feedback message containing the CSI parameters to the base station 105-*f*, which may be based at least in part on the selected CSI-RS resource and the channel measurements. In some cases, if the CSI-RS of the selected CSI-RS resource is precoded based on a time offset equal to 0, the reported CSI parameters may be determined to be for a closed loop transmission scheme. In some examples, the UE 115-*f* may report CRI, RI, PMI, and CQI associated with the CRI following reception of the at least one CSI-RS from the base station 105-*f*.

Figure 8:
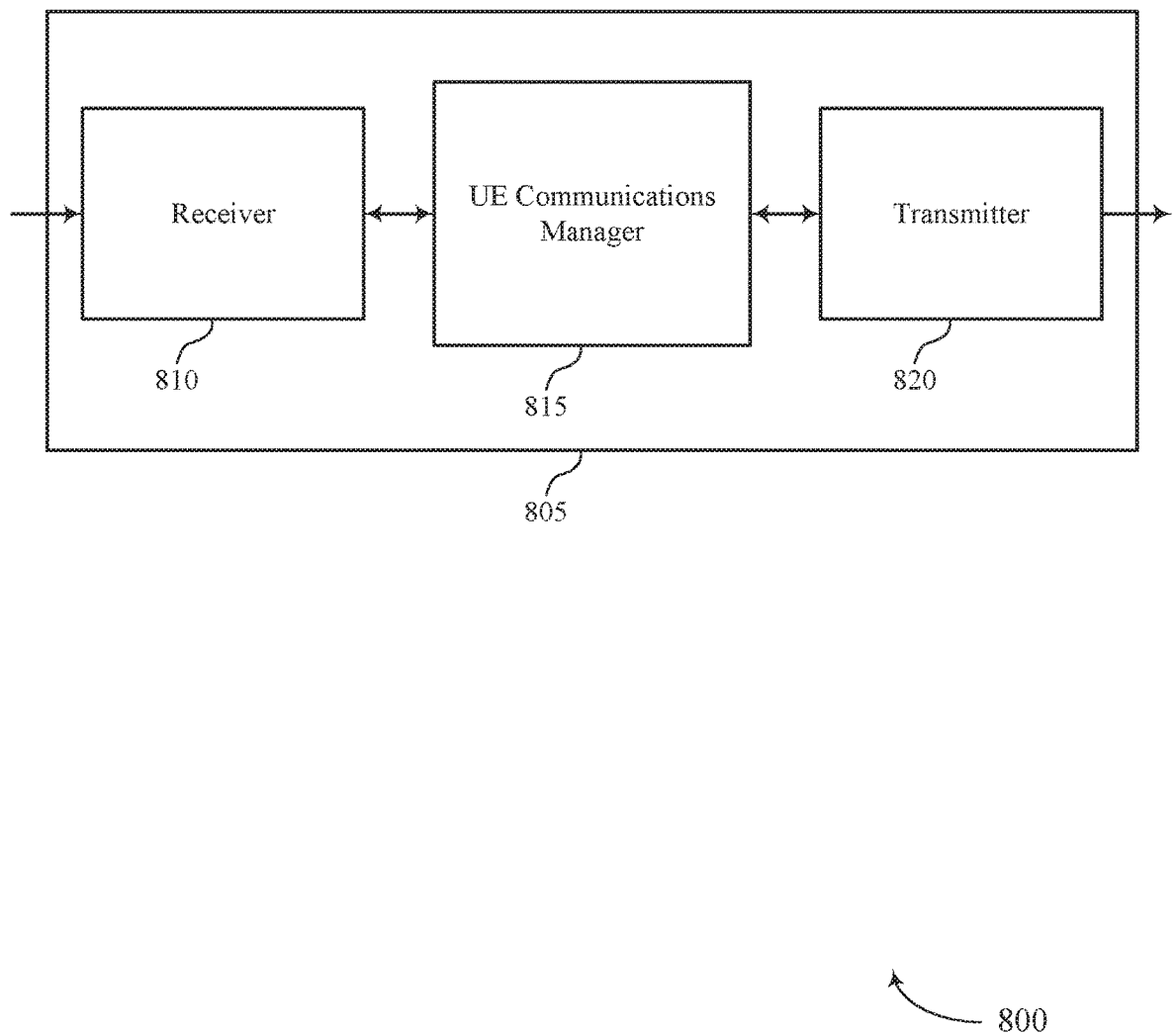
FIGS. 8 through 10 show block diagrams of a device that supports communication schemes for SCDD reference signals in accordance with aspects of the present disclosure.

FIG. 8 shows a block diagram 800 of a wireless device 805 that supports communication schemes for SCDD reference signals in accordance with aspects of the present disclosure. Wireless device 805 may be an example of aspects of a UE 115 as described herein. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to communication schemes for SCDD reference signals, etc.). Information may be passed on to other components of the device. The receiver 810 may be an example of aspects of the transceiver 1135 described with reference to FIG. 11. The receiver 810 may utilize a single antenna or a set of antennas.

UE communications manager 815 may be an example of aspects of the UE communications manager 1115 described with reference to FIG. 11.

UE communications manager 815 and/or at least some of its various sub-components may be implemented in hardware, software executed by a processor, firmware, or any combination thereof. If implemented in software executed by a processor, the functions of the UE communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 815 and/or at least some of its various sub-components may be physically located at various positions, including being distributed such that portions of functions are implemented at different physical locations by one or more physical devices. In some examples, UE communications manager 815 and/or at least some of its various sub-components may be a separate and distinct component in accordance with various aspects of the present disclosure. In other examples, UE communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 815 may receive, from a base station, a control message including at least one CSI configuration parameter and identify a time offset between a set of virtual antennas of the base station based on the at least one CSI configuration parameter. UE communications manager 815 perform measurements of a set of CSI-RSs associated with the set of virtual antennas of the base station and transmit, to the base station, a feedback message based on the identified time offset and the measurements of the set of CSI-RSs. The UE communications manager 815 may also receive a first CSI-RS of a set of CSI-RSs over a first set of resources corresponding to a first beam and a first delay offset, determine a first CSI parameter based on the first CSI-RS, and transmit, to the base station, a feedback message based on the determined first CSI parameter.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
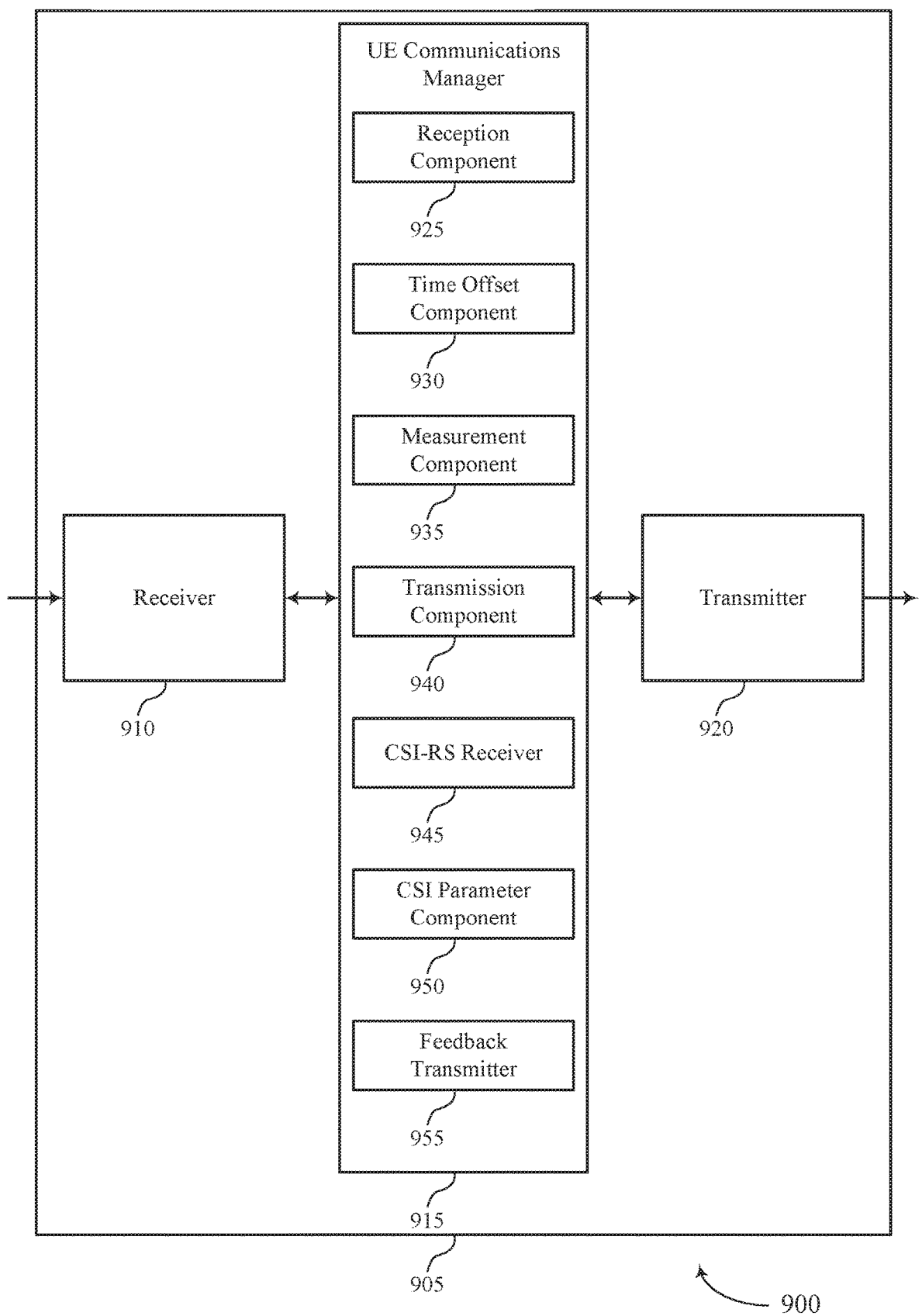

FIG. 9 shows a block diagram 900 of a wireless device 905 that supports communication schemes for SCDD reference signals in accordance with aspects of the present disclosure. Wireless device 905 may be an example of aspects of a wireless device 805 or a UE 115 as described with reference to FIG. 8. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to communication schemes for SCDD reference signals, etc.). Information may be passed on to other components of the device. The receiver 910 may be an example of aspects of the transceiver 1135 described with reference to FIG. 11. The receiver 910 may utilize a single antenna or a set of antennas.

UE communications manager 915 may be an example of aspects of the UE communications manager 1115 described with reference to FIG. 11. UE communications manager 915 may also include reception component 925, time offset component 930, measurement component 935, transmission component 940, CSI-RS receiver 945, CSI parameter component 950, and feedback transmitter 955.

Reception component 925 may receive, from a base station, a control message including at least one CSI configuration parameter. In some cases, the control message includes DCI from the base station, the DCI including the at least one CSI configuration parameter. In some cases, a format of the DCI includes at least one of a special DCI format or a DCI format for CSI-RS. In some cases, the DCI is for the UE or a group of UEs including the UE. In some cases, the control message includes an RRC message including the at least one CSI configuration parameter.

Time offset component 930 may identify a time offset between a set of virtual antennas of the base station based on the at least one CSI configuration parameter. In some cases, identifying the time offset includes: calculating the time offset based on the at least one CSI configuration parameter. In some cases, identifying the time offset includes: receiving an indication of a time offset configuration from the base station, the time offset configuration determined by one of a core network node or the base station. In some cases, the indication is received via DCI or a RRC message. In some cases, determining the time offset includes: selecting the time offset from a set of time offset candidates based on the measurements of the set of CSI-RSs. In some cases, the time offset candidates are determined based on the control message.

Measurement component 935 may perform, by the UE, measurements of a set of CSI-RSs associated with the set of virtual antennas of the base station and determine a fixed value of the time offset for use in performing the measurements, where the feedback message is based on the fixed value of the time offset.

Transmission component 940 may transmit, to the base station, a feedback message based on the identified time offset and the measurements of the set of CSI-RSs. In some cases, transmitting the feedback message further includes: transmitting an initial co-phase vector between the set of virtual antennas of the base station.

CSI-RS receiver 945 may receive a first CSI-RS of a set of CSI-RSs over a first set of resources corresponding to a first beam and a first delay offset and receive a second CSI-RS of the set of CSI-RSs over a second set of resources corresponding to a second beam and a second delay offset.

CSI parameter component 950 may determine a first CSI parameter based on the first CSI-RS and determine a second CSI parameter based on the second CSI-RS.

Feedback transmitter 955 may transmit, to the base station, a feedback message based on the determined first CSI parameter and transmit, to the base station, the feedback message based on the determined the second CSI parameter. In some cases, the feedback message includes at least one of a CRI, an RI, a PMI, an initial co-phase indicator, a CQI, or a combination thereof.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
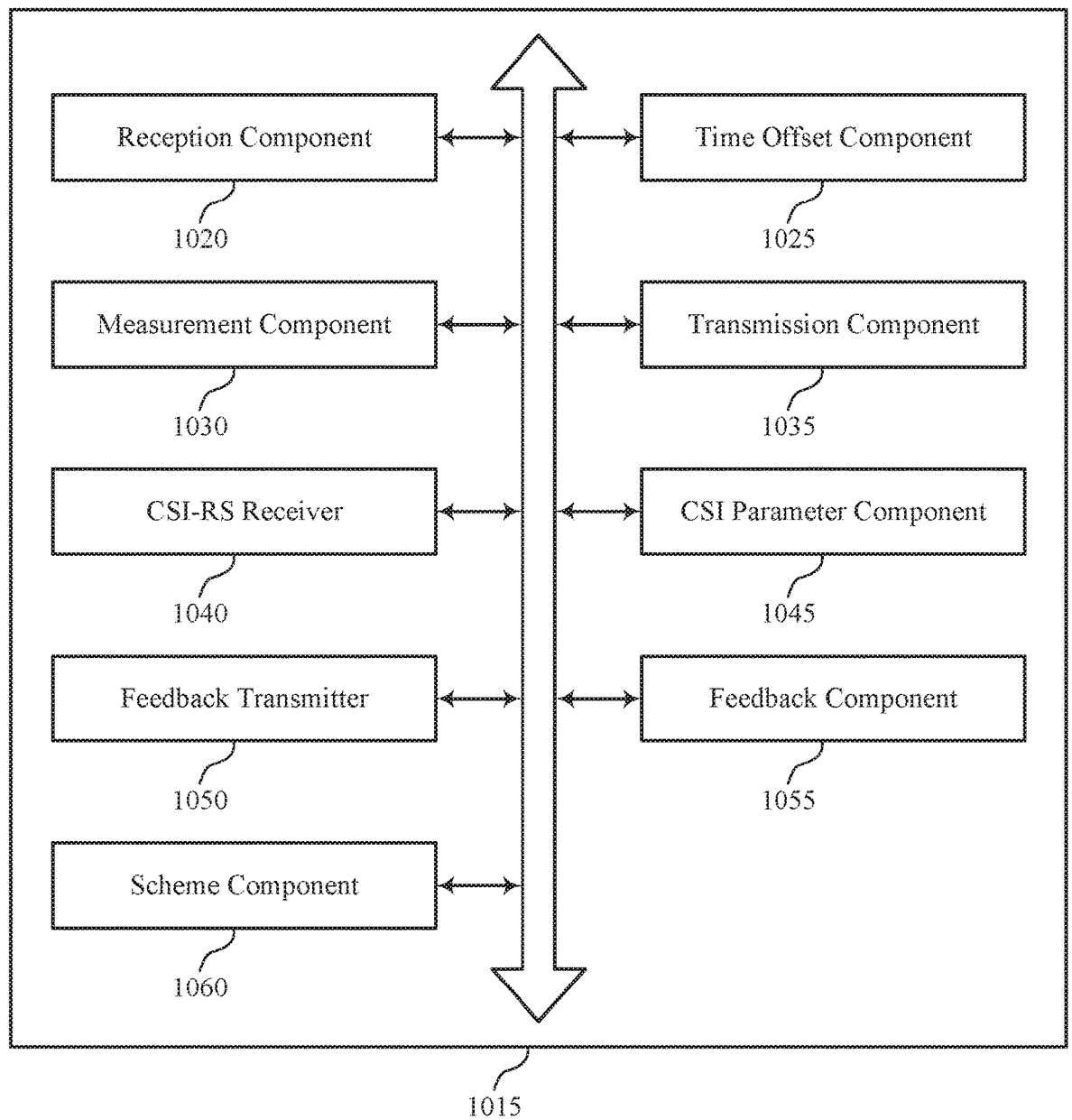

FIG. 10 shows a block diagram 1000 of a UE communications manager 1015 that supports communication schemes for SCDD reference signals in accordance with aspects of the present disclosure. The UE communications manager 1015 may be an example of aspects of a UE communications manager 815, a UE communications manager 915, or a UE communications manager 1115 described with reference to FIGS. 8, 9, and 11. The UE communications manager 1015 may include reception component 1020, time offset component 1025, measurement component 1030, transmission component 1035, CSI-RS receiver 1040, CSI parameter component 1045, feedback transmitter 1050, feedback component 1055, and scheme component 1060. Each of these modules may communicate, directly or indirectly, with one another (e.g., via one or more buses).

Reception component 1020 may receive, from a base station, a control message including at least one CSI configuration parameter. In some cases, the control message includes DCI from the base station, the DCI including the at least one CSI configuration parameter. In some cases, a format of the DCI includes at least one of a special DCI format or a DCI format for CSI-RS. In some cases, the DCI is for the UE or a group of UEs including the UE. In some cases, the control message includes a RRC message including the at least one CSI configuration parameter.

Time offset component 1025 may identify, by a UE, a time offset between a set of virtual antennas of the base station based on the at least one CSI configuration parameter. In some cases, identifying the time offset includes: calculating the time offset based on the at least one CSI configuration parameter. In some cases, identifying the time offset includes: receiving an indication of a time offset configuration from the base station, the time offset configuration determined by one of a core network node or the base station. In some cases, the indication is received via DCI or a RRC message. In some cases, determining the time offset includes: selecting the time offset from a set of time offset candidates based on the measurements of the set of CSI-RSs. In some cases, the time offset candidates are determined based on the control message.

Measurement component 1030 may perform, by the UE, measurements of a set of CSI-RSs associated with the set of virtual antennas of the base station and determine a fixed value of the time offset for use in performing the measurements, where the feedback message is based on the fixed value of the time offset.

Transmission component 1035 may transmit, to the base station, a feedback message based on the identified time offset and the measurements of the set of CSI-RSs. In some cases, transmitting the feedback message further includes: transmitting an initial co-phase vector between the set of virtual antennas of the base station.

CSI-RS receiver 1040 may receive a first CSI-RS of a set of CSI-RSs over a first set of resources corresponding to a first beam and a first delay offset and receive a second CSI-RS of the set of CSI-RSs over a second set of resources corresponding to a second beam and a second delay offset.

CSI parameter component 1045 may determine a first CSI parameter based on the first CSI-RS and determine a second CSI parameter based on the second CSI-RS.

Feedback transmitter 1050 may transmit, to the base station, a feedback message based on the determined first CSI parameter and transmit, to the base station, the feedback message based on the determined the second CSI parameter. In some cases, the feedback message includes at least one of a CRI, an RI, a PMI, an initial co-phase indicator, a CQI, or a combination thereof.

Feedback component 1055 may compute CSI feedback for at least one CSI-RS based on the time offset configuration, where the feedback message includes the computed CSI feedback and determine, based on the time offset, at least one CSI parameter from a group consisting of: a rank indicator, an initial co-phase indicator, a precoder matrix indicator, and a channel quality indicator, where the determined at least one CSI parameter is included in the feedback message.

Scheme component 1060 may select, based on a determination that the time offset equals 0 or a determination that a selected CSI resource corresponds to the time offset equal to 0, a closed loop transmission scheme procedure for transmitting the feedback message and select a closed loop transmission scheme procedure for transmitting the feedback message.

Figure 11:
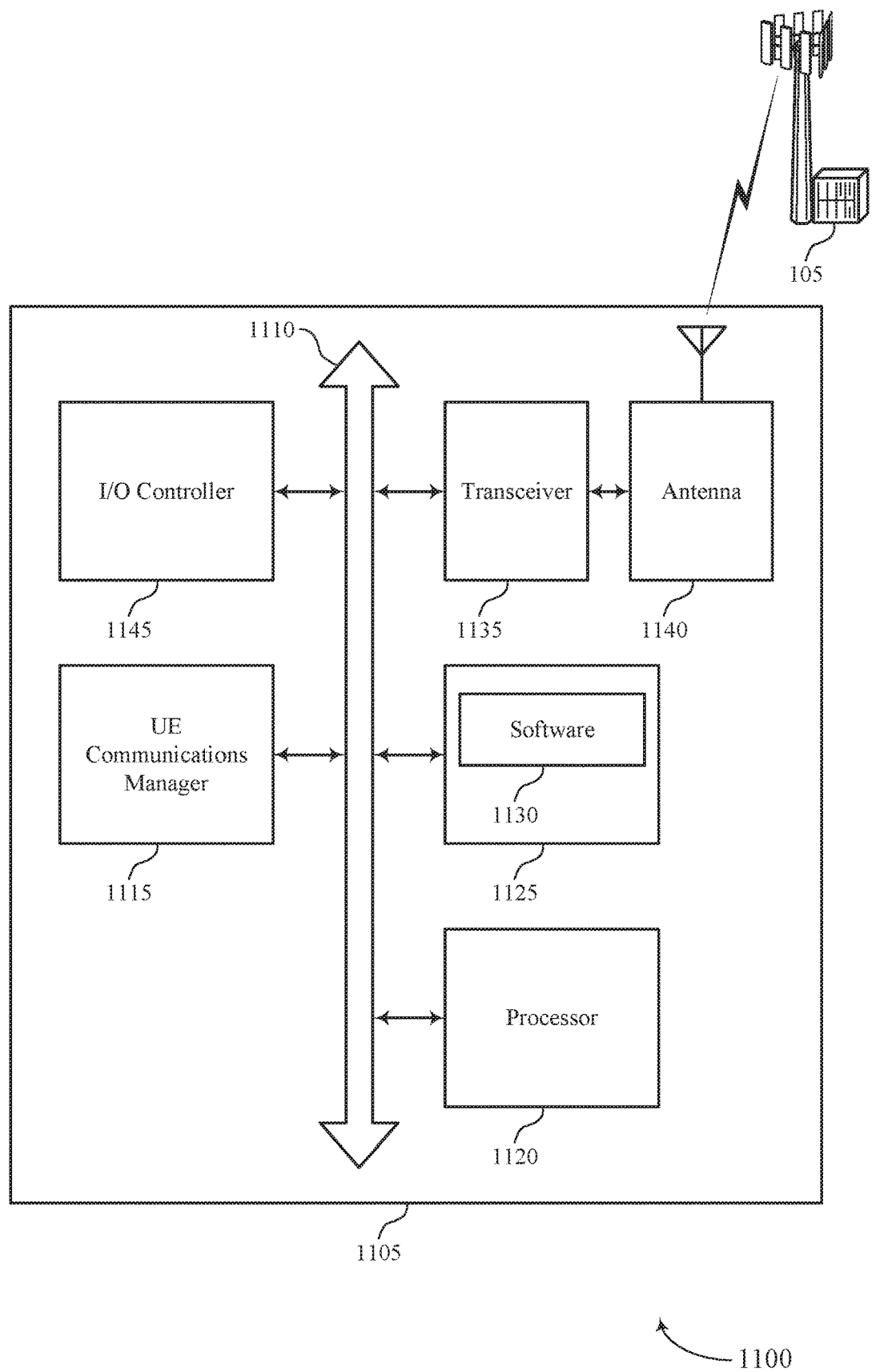
FIG. 11 illustrates a block diagram of a system including a UE that supports communication schemes for SCDD reference signals in accordance with aspects of the present disclosure.

FIG. 11 shows a diagram of a system 1100 including a device 1105 that supports communication schemes for SCDD reference signals in accordance with aspects of the present disclosure. Device 1105 may be an example of or include the components of wireless device 805, wireless device 905, or a UE 115 as described above, e.g., with reference to FIGS. 8 and 9. Device 1105 may include components for bi-directional voice and data communications including components for transmitting and receiving communications, including UE communications manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting communication schemes for SCDD reference signals).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support communication schemes for SCDD reference signals. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
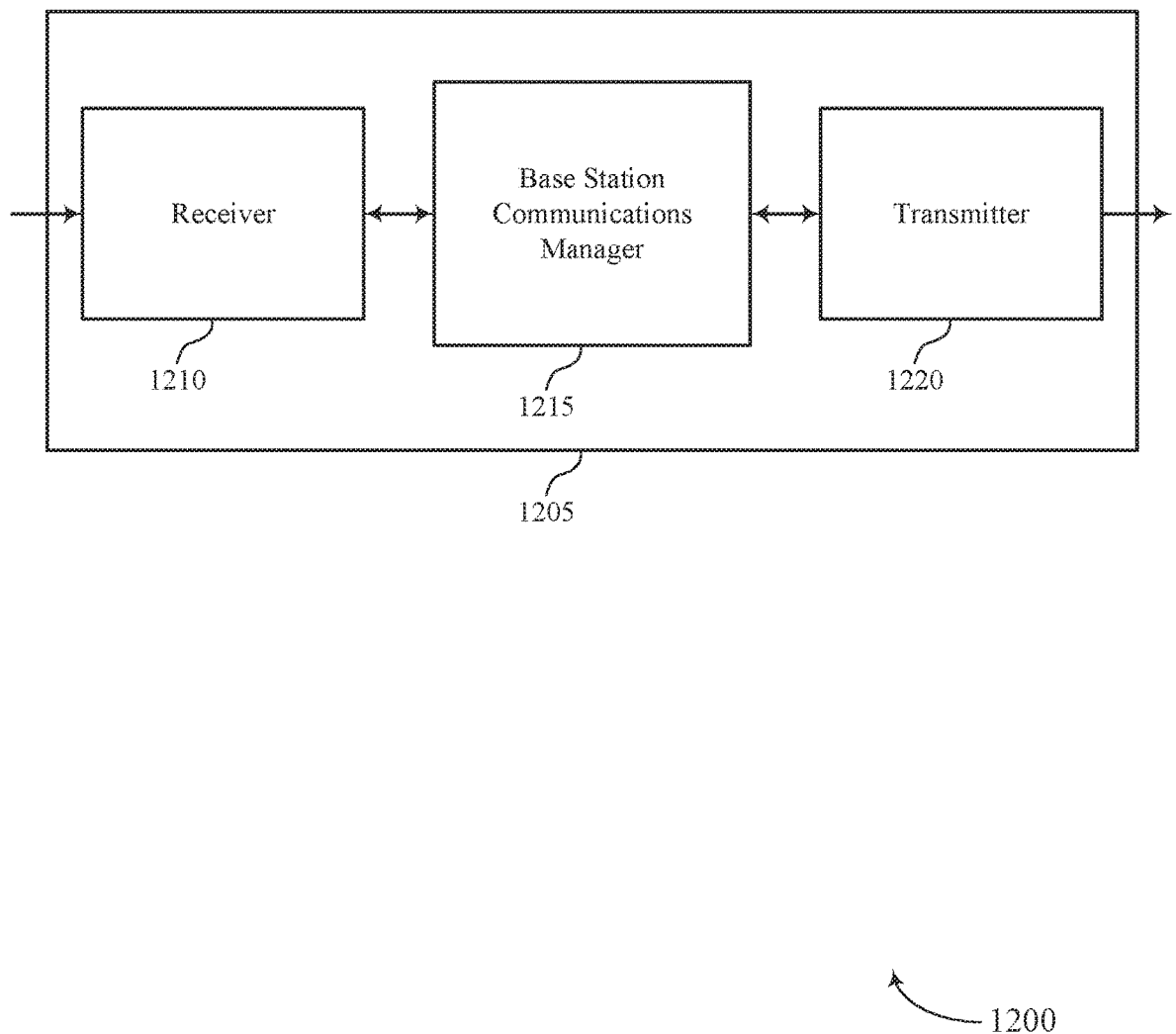
FIGS. 12 through 14 show block diagrams of a device that supports communication schemes for SCDD reference signals in accordance with aspects of the present disclosure.

FIG. 12 shows a block diagram 1200 of a wireless device 1205 that supports communication schemes for SCDD reference signals in accordance with aspects of the present disclosure. Wireless device 1205 may be an example of aspects of a base station 105 as described herein. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to communication schemes for SCDD reference signals, etc.). Information may be passed on to other components of the device. The receiver 1210 may be an example of aspects of the transceiver 1535 described with reference to FIG. 15. The receiver 1210 may utilize a single antenna or a set of antennas.

Base station communications manager 1215 may be an example of aspects of the base station communications manager 1515 described with reference to FIG. 15. Base station communications manager 1215 and/or at least some of its various sub-components may be implemented in hardware, software executed by a processor, firmware, or any combination thereof. If implemented in software executed by a processor, the functions of the base station communications manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1215 and/or at least some of its various sub-components may be physically located at various positions, including being distributed such that portions of functions are implemented at different physical locations by one or more physical devices. In some examples, base station communications manager 1215 and/or at least some of its various sub-components may be a separate and distinct component in accordance with various aspects of the present disclosure. In other examples, base station communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1215 may transmit a control message including at least one CSI configuration parameter and a request to report a time offset between a set of virtual antennas of the base station and measurements of a set of CSI-RSs associated with the set of virtual antennas of the base station and receive, from a UE and in response to the request, a feedback message based on the time offset and the measurements of the set of CSI-RSs. The base station communications manager 1215 may also transmit, to a UE, a first CSI-RS of a set of CSI-RSs over a first set of resources corresponding to a first beam and a first delay offset and receive, from the UE, a feedback message that includes a first CSI parameter, where the first CSI parameter is based on the first CSI-RS.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
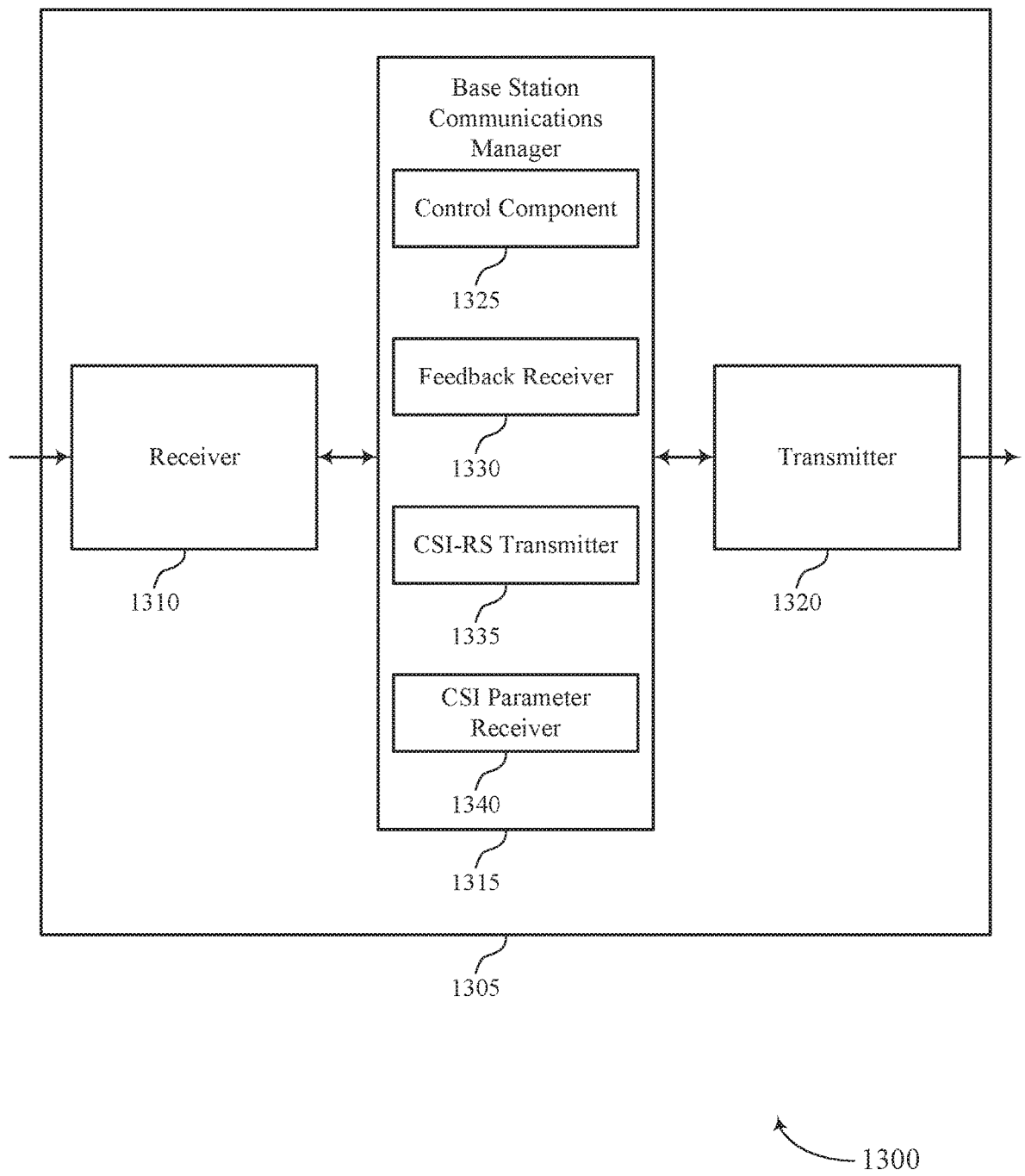

FIG. 13 shows a block diagram 1300 of a wireless device 1305 that supports communication schemes for SCDD reference signals in accordance with aspects of the present disclosure. Wireless device 1305 may be an example of aspects of a wireless device 1205 or a base station 105 as described with reference to FIG. 12. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to communication schemes for SCDD reference signals, etc.). Information may be passed on to other components of the device. The receiver 1310 may be an example of aspects of the transceiver 1535 described with reference to FIG. 15. The receiver 1310 may utilize a single antenna or a set of antennas.

Base station communications manager 1315 may be an example of aspects of the base station communications manager 1515 described with reference to FIG. 15. Base station communications manager 1315 may also include control component 1325, feedback receiver 1330, CSI-RS transmitter 1335, and CSI parameter receiver 1340.

Control component 1325 may transmit a control message including at least one CSI configuration parameter and a request to report a time offset between a set of virtual antennas of the base station and measurements of a set of CSI-RSs associated with the set of virtual antennas of the base station.

Feedback receiver 1330 may receive, from a UE and in response to the request, a feedback message based on the time offset and the measurements of the set of CSI-RSs, receive, from the UE, a UE time offset and at least one CSI parameter based on the UE time offset, where the at least one CSI parameter is included in the feedback message, and receive, from the UE, at least one CSI parameter based on a fixed time offset, where the at least one CSI parameter is included in the feedback message. In some cases, the feedback message includes CSI feedback for at least one CSI-RS of the set of CSI-RSs based on the time offset configuration.

CSI-RS transmitter 1335 may transmit, to a UE, a first CSI-RS of a set of CSI-RSs over a first set of resources corresponding to a first beam and a first delay offset and transmit, to the UE, a second CSI-RS of the set of CSI-RSs over a second set of resources corresponding to a second beam and a second delay offset, where the feedback message includes a second CSI parameter based on the second CSI-RS.

CSI parameter receiver 1340 may receive, from the UE, a feedback message that includes a first CSI parameter, where the first CSI parameter is based on the first CSI-RS.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
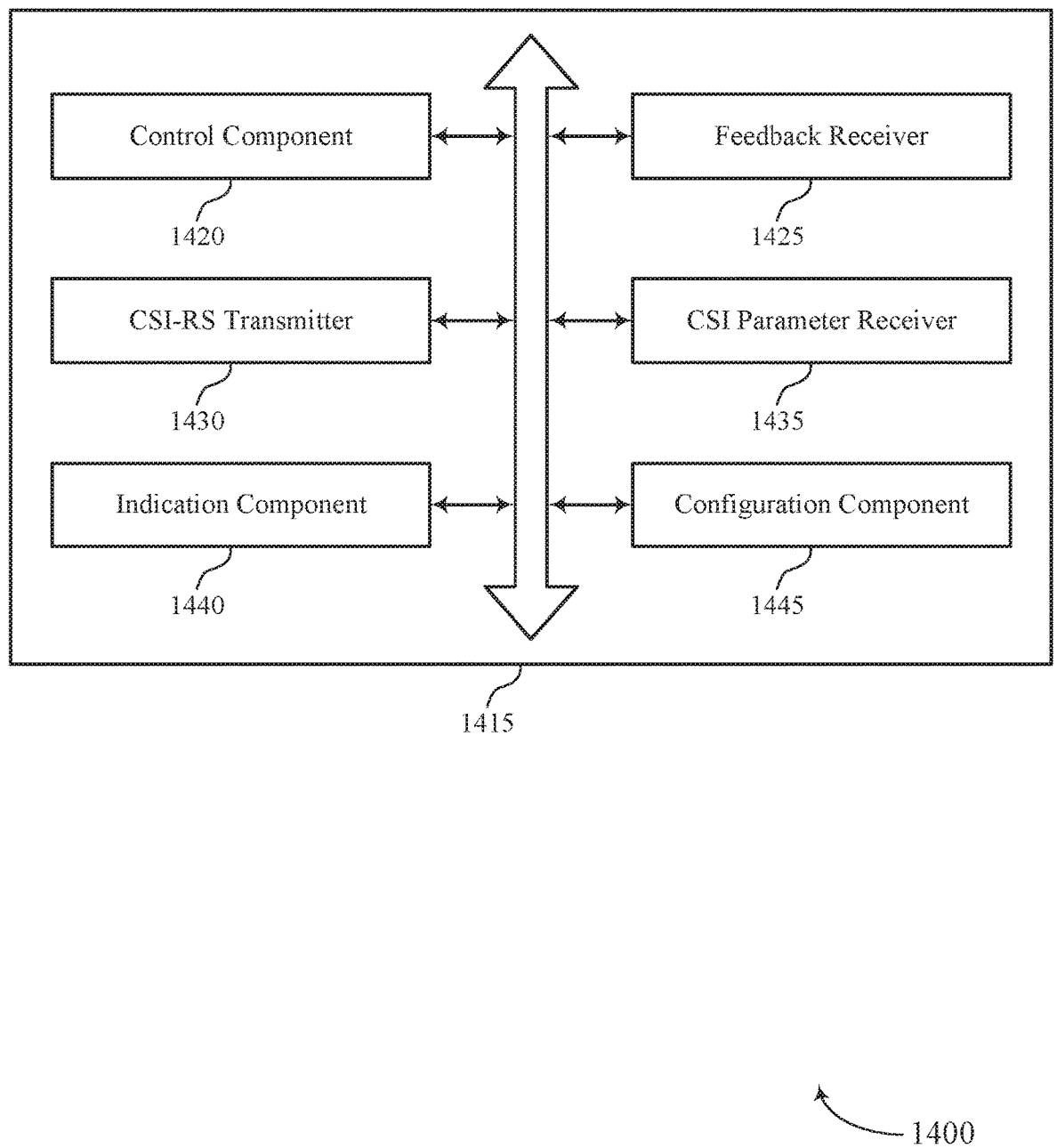

FIG. 14 shows a block diagram 1400 of a base station communications manager 1415 that supports communication schemes for SCDD reference signals in accordance with aspects of the present disclosure. The base station communications manager 1415 may be an example of aspects of a base station communications manager 1515 described with reference to FIGS. 12, 13, and 15. The base station communications manager 1415 may include control component 1420, feedback receiver 1425, CSI-RS transmitter 1430, CSI parameter receiver 1435, indication component 1440, and configuration component 1445. Each of these modules may communicate, directly or indirectly, with one another (e.g., via one or more buses).

Control component 1420 may transmit a control message including at least one CSI configuration parameter and a request to report a time offset between a set of virtual antennas of the base station and measurements of a set of CSI-RSs associated with the set of virtual antennas of the base station.

Feedback receiver 1425 may receive, from a UE and in response to the request, a feedback message based on the time offset and the measurements of the set of CSI-RSs, receive, from the UE, a UE time offset and at least one CSI parameter based on the UE time offset, where the at least one CSI parameter is included in the feedback message, and receive, from the UE, at least one CSI parameter based on a fixed time offset, where the at least one CSI parameter is included in the feedback message. In some cases, the feedback message includes CSI feedback for at least one CSI-RS of the set of CSI-RSs based on the time offset configuration.

CSI-RS transmitter 1430 may transmit, to a UE, a first CSI-RS of a set of CSI-RSs over a first set of resources corresponding to a first beam and a first delay offset and transmit, to the UE, a second CSI-RS of the set of CSI-RSs over a second set of resources corresponding to a second beam and a second delay offset, where the feedback message includes a second CSI parameter based on the second CSI-RS.

CSI parameter receiver 1435 may receive, from the UE, a feedback message that includes a first CSI parameter, where the first CSI parameter is based on the first CSI-RS.

Indication component 1440 may transmit, to the UE, an indication of a time offset configuration, the time offset configuration determined by one of a core network node or the base station. In some cases, the indication is transmitted via DCI, a radio resource control message, or within the control message.

Configuration component 1445 may configure a set of time offset candidates for the UE, where the control message includes the set of time offset candidates.

Figure 15:
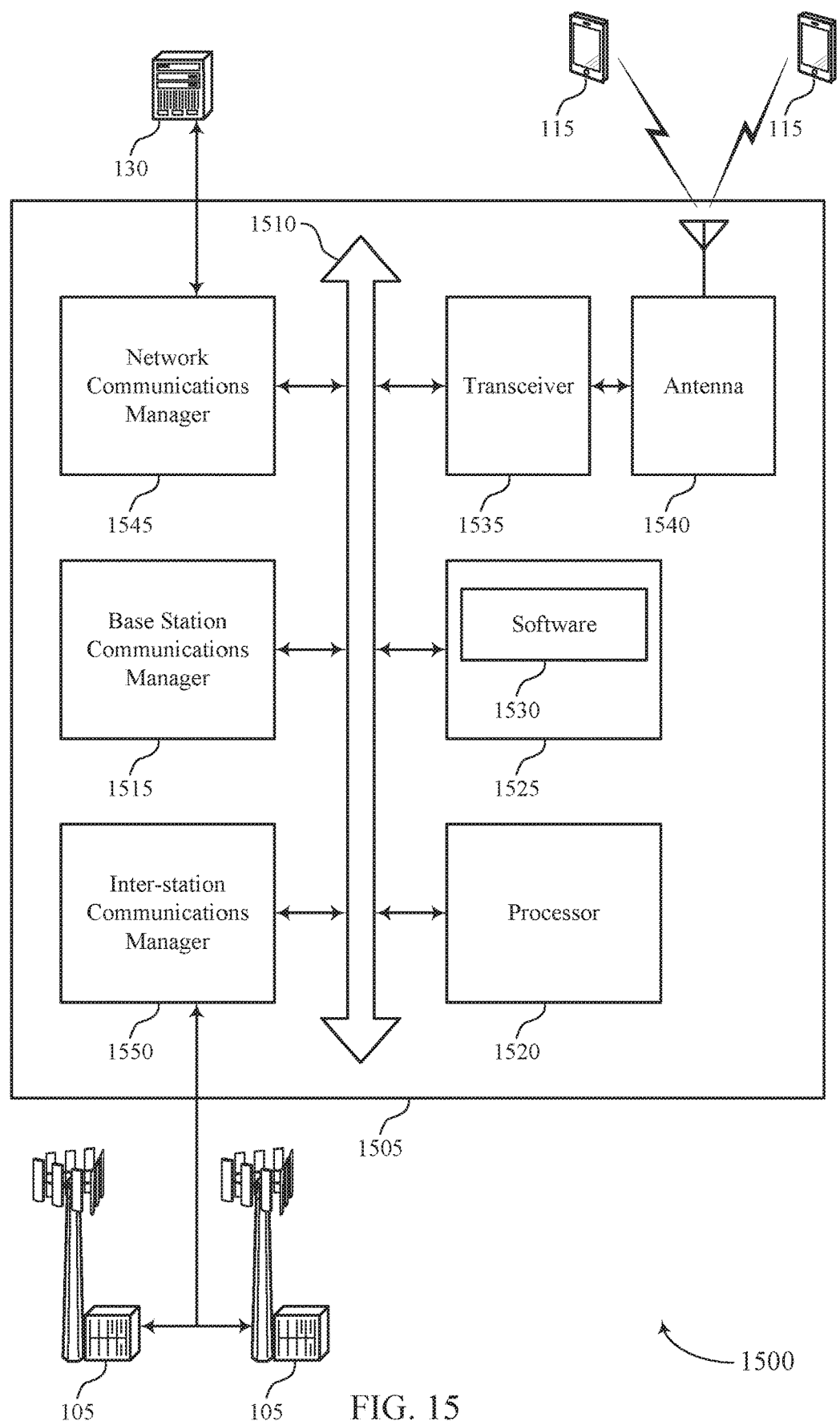
FIG. 15 illustrates a block diagram of a system including a base station that supports communication schemes for SCDD reference signals in accordance with aspects of the present disclosure.

FIG. 15 shows a diagram of a system 1500 including a device 1505 that supports communication schemes for SCDD reference signals in accordance with aspects of the present disclosure. Device 1505 may be an example of or include the components of base station 105 as described above, e.g., with reference to FIG. 1. Device 1505 may include components for bi-directional voice and data communications including components for transmitting and receiving communications, including base station communications manager 1515, processor 1520, memory 1525, software 1530, transceiver 1535, antenna 1540, network communications manager 1545, and inter-station communications manager 1550. These components may be in electronic communication via one or more buses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting communication schemes for SCDD reference signals).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware or software operation such as the interaction with peripheral components or devices.

Software 1530 may include code to implement aspects of the present disclosure, including code to support communication schemes for SCDD reference signals. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Inter-station communications manager 1550 may manage communications with other base station 105, and may include a controller or scheduler for controlling communications with UEs 115 in cooperation with other base stations 105. For example, the inter-station communications manager 1550 may coordinate scheduling for transmissions to UEs 115 for various interference mitigation techniques such as beamforming or joint transmission. In some examples, inter-station communications manager 1550 may provide an X2 interface within an LTE/LTE-A wireless communication network technology to provide communication between base stations 105.

Figure 16:
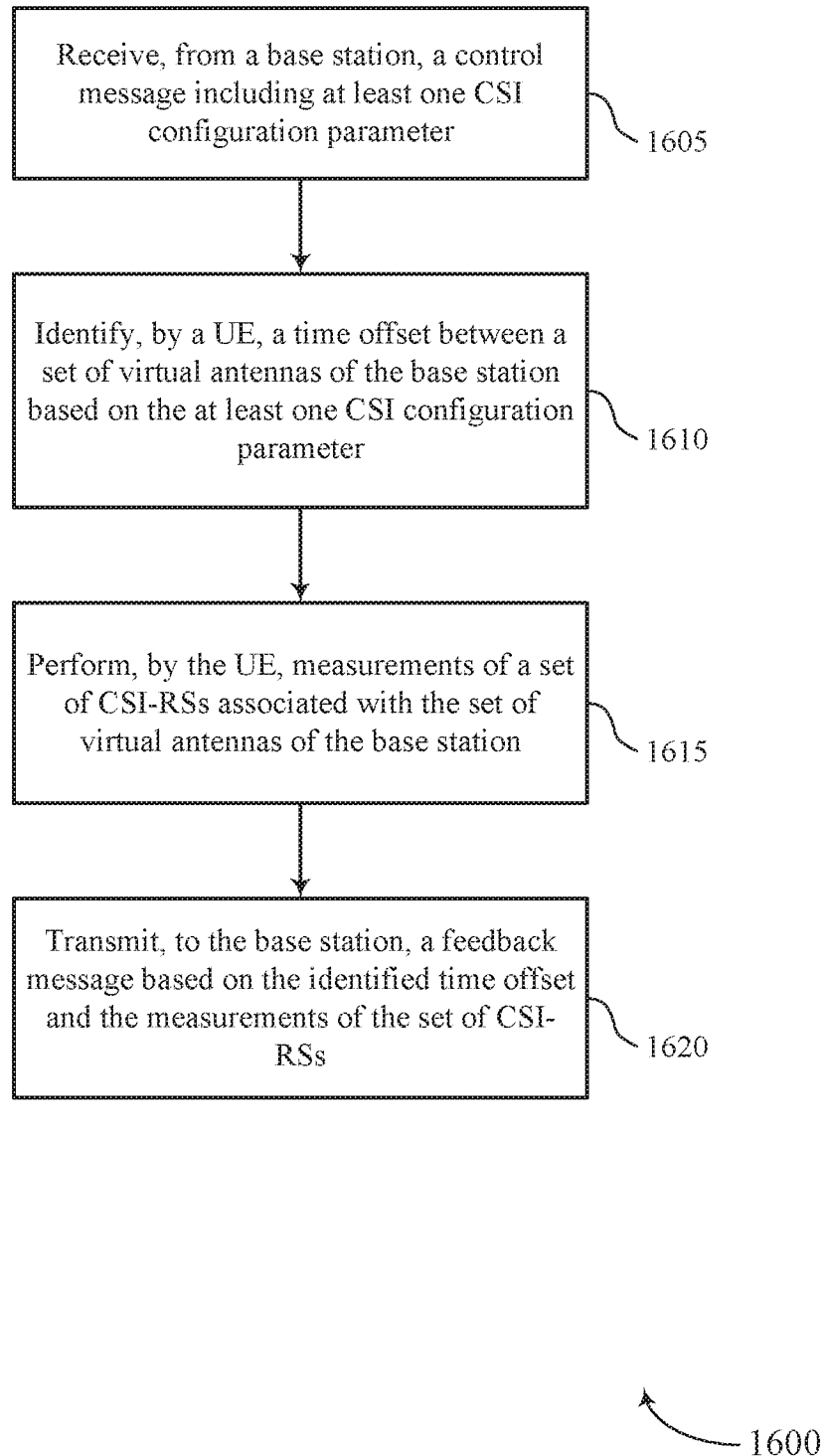
FIGS. 16 through 19 illustrate methods for communication schemes for SCDD reference signals in accordance with aspects of the present disclosure.

FIG. 16 shows a flowchart illustrating a method 1600 for communication schemes for SCDD reference signals in accordance with aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive, from a base station, a control message comprising at least one CSI configuration parameter. The operations of block 1605 may be performed according to the methods described herein. In certain examples, aspects of the operations of block 1605 may be performed by a reception component as described with reference to FIGS. 8 through 11.

At block 1610 the UE 115 may identify a time offset between a plurality of virtual antennas of the base station based at least in part on the at least one CSI configuration parameter. The operations of block 1610 may be performed according to the methods described herein. In certain examples, aspects of the operations of block 1610 may be performed by a time offset component as described with reference to FIGS. 8 through 11.

At block 1615 the UE 115 may perform measurements of a plurality of CSI-RSs associated with the plurality of virtual antennas of the base station. The operations of block 1615 may be performed according to the methods described herein. In certain examples, aspects of the operations of block 1615 may be performed by a measurement component as described with reference to FIGS. 8 through 11.

At block 1620 the UE 115 may transmit, to the base station, a feedback message based at least in part on the identified time offset and the measurements of the plurality of CSI-RSs. The operations of block 1620 may be performed according to the methods described herein. In certain examples, aspects of the operations of block 1620 may be performed by a transmission component as described with reference to FIGS. 8 through 11.

Figure 17:
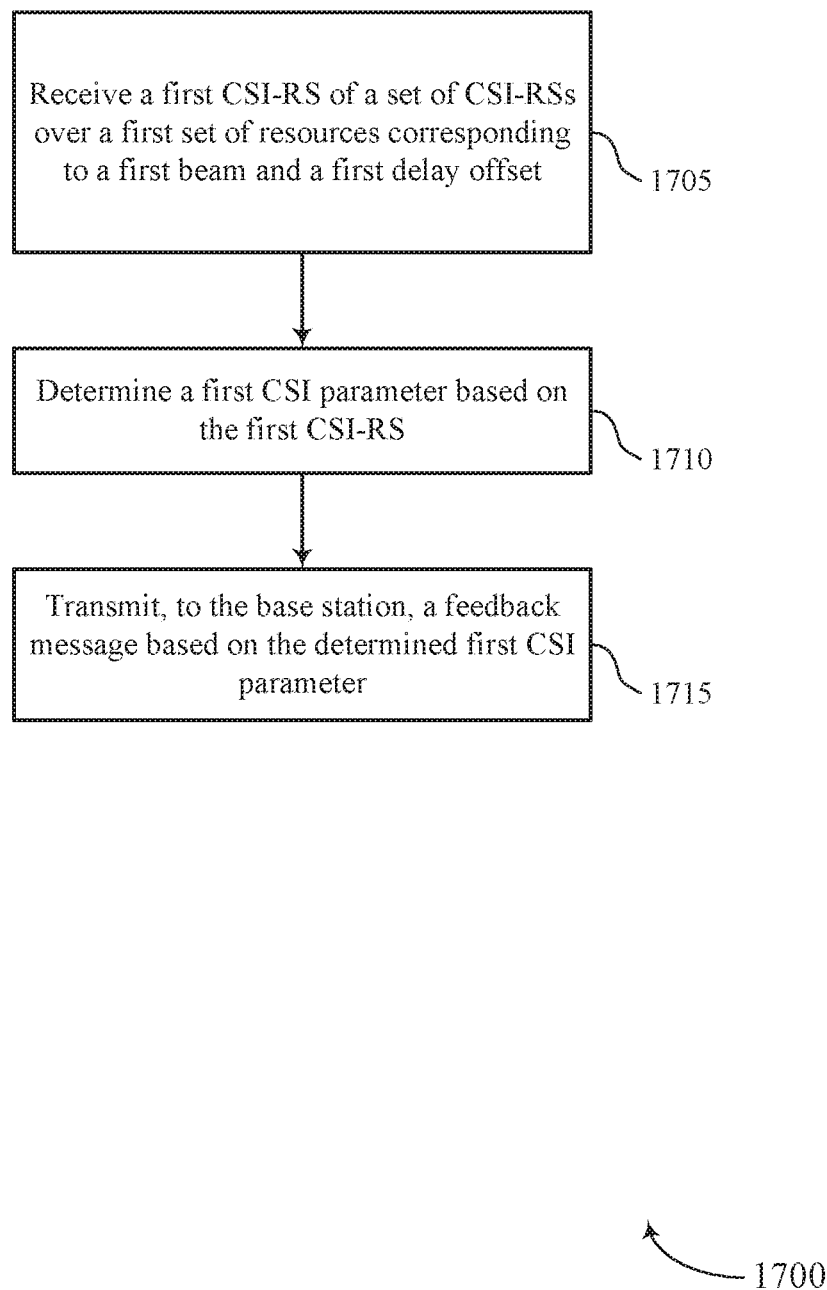

FIG. 17 shows a flowchart illustrating a method 1700 for communication schemes for SCDD reference signals in accordance with aspects of the present disclosure. The operations of method 1700 may be implemented by a UE 115 or its components as described herein. For example, the operations of method 1700 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive a first CSI-RS of a plurality of CSI-RSs over a first set of resources corresponding to a first beam and a first delay offset. The operations of block 1705 may be performed according to the methods described herein. In certain examples, aspects of the operations of block 1705 may be performed by a CSI-RS receiver as described with reference to FIGS. 8 through 11.

At block 1710 the UE 115 may determine a first CSI parameter based at least in part on the first CSI-RS. The operations of block 1710 may be performed according to the methods described herein. In certain examples, aspects of the operations of block 1710 may be performed by a CSI parameter component as described with reference to FIGS. 8 through 11.

At block 1715 the UE 115 may transmit, to the base station, a feedback message based at least in part on the determined first CSI parameter. The operations of block 1715 may be performed according to the methods described herein. In certain examples, aspects of the operations of block 1715 may be performed by a feedback transmitter as described with reference to FIGS. 8 through 11.

Figure 18:
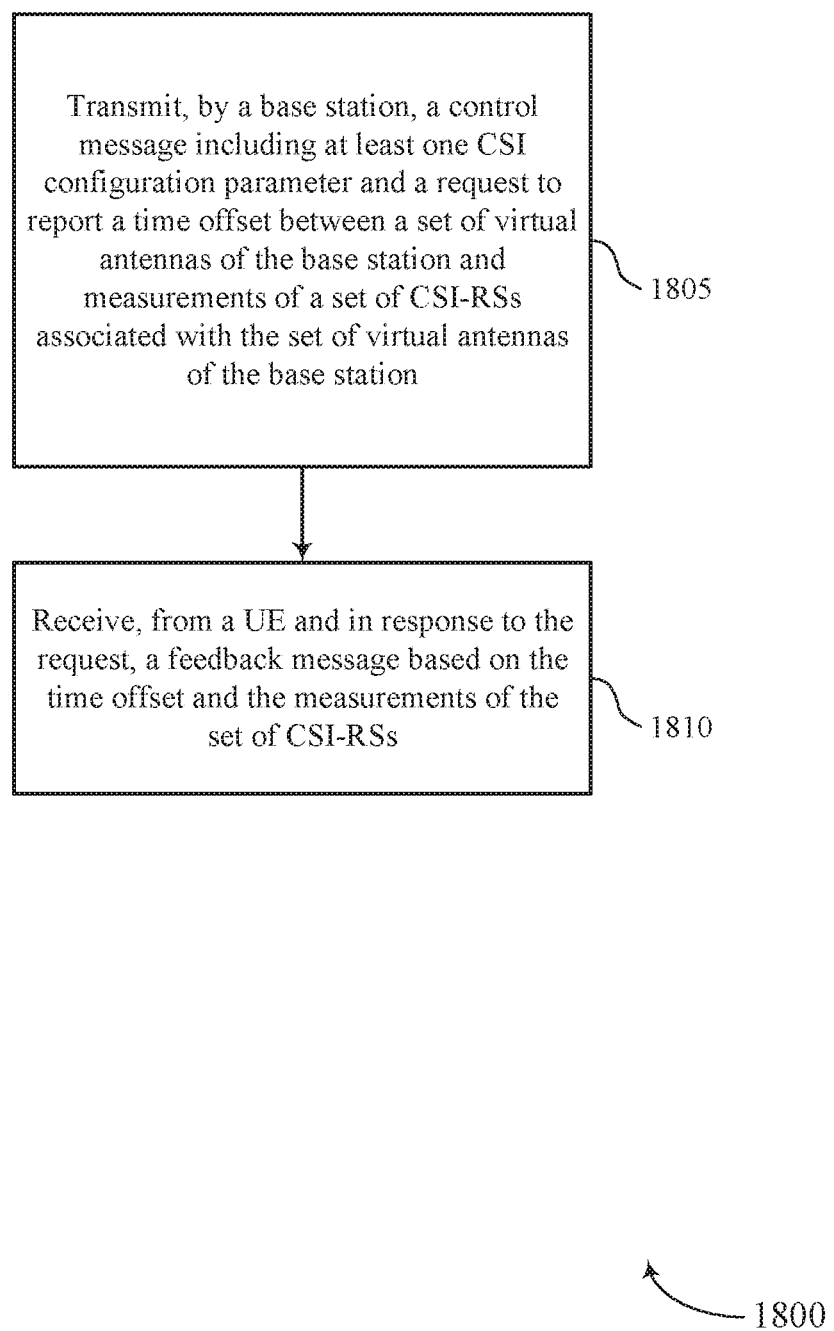

FIG. 18 shows a flowchart illustrating a method 1800 for communication schemes for SCDD reference signals in accordance with aspects of the present disclosure. The operations of method 1800 may be implemented by a base station 105 or its components as described herein. For example, the operations of method 1800 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may transmit a control message comprising at least one CSI configuration parameter and a request to report a time offset between a plurality of virtual antennas of the base station and measurements of a plurality of CSI-RSs associated with the plurality of virtual antennas of the base station. The operations of block 1805 may be performed according to the methods described herein. In certain examples, aspects of the operations of block 1805 may be performed by a control component as described with reference to FIGS. 12 through 15.

At block 1810 the base station 105 may receive, from a UE and in response to the request, a feedback message based at least in part on the time offset and the measurements of the plurality of CSI-RSs. The operations of block 1810 may be performed according to the methods described herein. In certain examples, aspects of the operations of block 1810 may be performed by a feedback receiver as described with reference to FIGS. 12 through 15.

Figure 19:
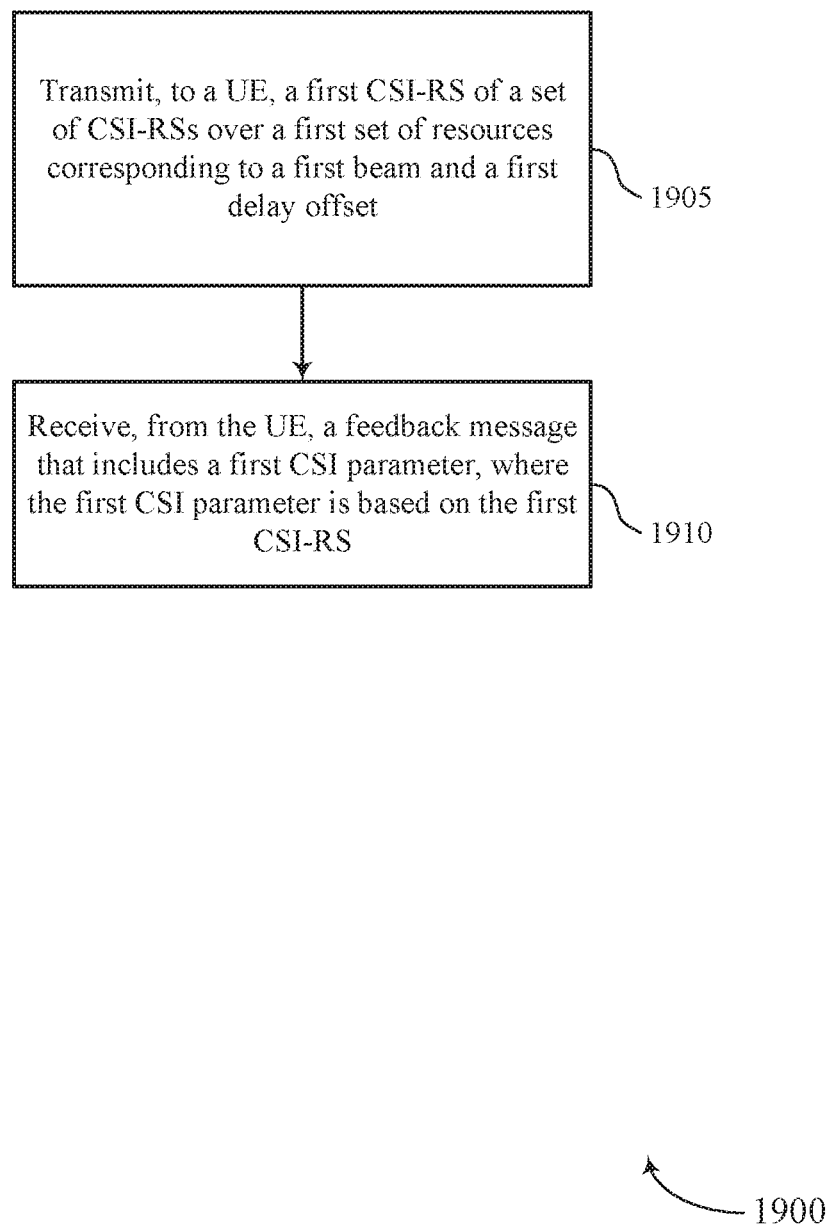

FIG. 19 shows a flowchart illustrating a method 1900 for communication schemes for SCDD reference signals in accordance with aspects of the present disclosure. The operations of method 1900 may be implemented by a base station 105 or its components as described herein. For example, the operations of method 1900 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may transmit, to a UE, a first CSI-RS of a plurality of CSI-RSs over a first set of resources corresponding to a first beam and a first delay offset. The operations of block 1905 may be performed according to the methods described herein. In certain examples, aspects of the operations of block 1905 may be performed by a CSI-RS transmitter as described with reference to FIGS. 12 through 15.

At block 1910 the base station 105 may receive, from the UE, a feedback message that includes a first CSI parameter, wherein the first CSI parameter is based at least in part on the first CSI-RS. The operations of block 1910 may be performed according to the methods described herein. In certain examples, aspects of the operations of block 1910 may be performed by a CSI parameter receiver as described with reference to FIGS. 12 through 15.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    receiving, from a base station, a control message comprising at least one channel state information (CSI) configuration parameter;
    identifying, by a user equipment (UE), a time offset between a plurality of virtual antennas of the base station based at least in part on the at least one CSI configuration parameter;
    performing, by the UE, measurements of a plurality of CSI reference signals (CSI-RSs) associated with the plurality of virtual antennas of the base station; and transmitting, to the base station, a feedback message based at least in part on the identified time offset and the measurements of the plurality of CSI-RSs.

2. The method of claim 1, wherein identifying the time offset comprises:
calculating the time offset based at least in part on the at least one CSI configuration parameter.

3. The method of claim 1, wherein transmitting the feedback message further comprises:
transmitting an initial co-phase vector between the plurality of virtual antennas of the base station.

4. The method of claim 1, wherein identifying the time offset comprises:
receiving an indication of a time offset configuration from the base station, the time offset configuration determined by one of a core network node or the base station.

5. The method of claim 4, wherein the indication is received via downlink control information (DCI) or a radio resource control (RRC) message.

6. The method of claim 5, further comprising:
computing CSI feedback for at least one CSI-RS based at least in part on the time offset configuration, wherein the feedback message includes the computed CSI feedback.

7. The method of claim 1, wherein the control message comprises downlink control information (DCI) from the base station, the DCI comprising the at least one CSI configuration parameter.

8. The method of claim 7, wherein a format of the DCI comprises at least one of a special DCI format or a DCI format for CSI-RS.

9. The method of claim 7, wherein the DCI is for the UE or a group of UEs including the UE.

10. The method of claim 9, wherein the control message comprises a radio resource control (RRC) message comprising the at least one CSI configuration parameter.

11. The method of claim 1, further comprising:
determining a fixed value of the time offset for use in performing the measurements, wherein the feedback message is based at least in part on the fixed value of the time offset.

12. The method of claim 1, wherein determining the time offset comprises:
selecting the time offset from a set of time offset candidates based at least in part on the measurements of the plurality of CSI-RSs.

13. The method of claim 12, wherein the set of time offset candidates is determined based at least in part on the control message.

14. The method of claim 1, further comprising:
determining, based at least in part on the time offset, at least one CSI parameter from a group consisting of: a rank indicator, an initial co-phase indicator, a precoder matrix indicator, and a channel quality indicator, wherein the determined at least one CSI parameter is included in the feedback message.

15. The method of claim 1, further comprising:
selecting, based on a determination that the time offset equals 0 or a determination that a selected CSI resource corresponds to the time offset equal to 0, a closed loop transmission scheme procedure for transmitting the feedback message.

16. A method for wireless communication, comprising:
receiving, from a base station, a first channel state information (CSI) reference signal (CSI-RS) of a plurality of CSI-RSs over a first set of resources corresponding to a first beam and a first delay offset, the first delay offset between a plurality of virtual antennas of the base station;
determining a first CSI parameter based at least in part on the first CSI-RS; and
transmitting, to the base station, a feedback message based at least in part on the determined first CSI parameter.

17. The method of claim 16, further comprising:
receiving a second CSI-RS of the plurality of CSI-RSs over a second set of resources corresponding to a second beam and a second delay offset;
determining a second CSI parameter based at least in part on the second CSI-RS; and
transmitting, to the base station, the feedback message based at least in part on the determined the second CSI parameter.

18. The method of claim 16, wherein the feedback message comprises at least one of a CSI Resource Indicator (CRI), a Rank Indicator (RI), a Precoder Matrix Indicator (PMI), an initial co-phase indicator, a Channel Quality Indicator (CQI), or a combination thereof.

19. The method of claim 16, further comprising:
selecting a closed loop transmission scheme procedure for transmitting the feedback message.

20. A method for wireless communication, comprising:
transmitting, by a base station, a control message comprising at least one channel state information (CSI) configuration parameter and a request to report a time offset between a plurality of virtual antennas of the base station and measurements of a plurality of CSI reference signals (CSI-RSs) associated with the plurality of virtual antennas of the base station; and
receiving, from a user equipment (UE) and in response to the request, a feedback message based at least in part on the time offset and the measurements of the plurality of CSI-RSs.

21. The method of claim 20, further comprising:
transmitting, to the UE, an indication of a time offset configuration, the time offset configuration determined by one of a core network node or the base station.

22. The method of claim 21, wherein the indication is transmitted via downlink control information (DCI), a radio resource control message, or within the control message.

23. The method of claim 21, wherein the feedback message includes CSI feedback for at least one CSI-RS of the plurality of CSI-RSs based at least in part on the time offset configuration.

24. The method of claim 20, further comprising:
configuring a set of time offset candidates for the UE, wherein the control message includes the set of time offset candidates.

25. The method of claim 20, further comprising:
receiving, from the UE, a UE time offset and at least one CSI parameter based at least in part on the UE time offset, wherein the at least one CSI parameter is included in the feedback message.

26. The method of claim 20, further comprising:
receiving, from the UE, at least one CSI parameter based at least in part on a fixed time offset, wherein the at least one CSI parameter is included in the feedback message.

27. A method for wireless communication, comprising:
transmitting, by a base station and to a user equipment (UE), a first channel state information (CSI) reference signal (CSI-RS) of a plurality of CSI-RSs over a first set of resources corresponding to a first beam and a first delay offset, the first delay offset between a plurality of virtual antennas of the base station; and receiving, from the UE, a feedback message that includes a first CSI parameter, wherein the first CSI parameter is based at least in part on the first CSI-RS.

28. The method of claim 27, further comprising:
transmitting, to the UE, a second CSI-RS of the plurality of CSI-RSs over a second set of resources corresponding to a second beam and a second delay offset, wherein the feedback message includes a second CSI parameter based at least in part on the second CSI-RS.

29. An apparatus for wireless communication, comprising:
a processor;
memory coupled with the processor; and
instructions stored in the memory and operable, when executed by the processor, to cause the apparatus to:
receive, from a base station, a control message comprising at least one channel state information (CSI) configuration parameter;
identify, by a user equipment (UE), a time offset between a plurality of virtual antennas of the base station based at least in part on the at least one CSI configuration parameter;
perform, by the UE, measurements of a plurality of CSI reference signals (CSI-RSs) associated with the plurality of virtual antennas of the base station; and
transmit, to the base station, a feedback message based at least in part on the identified time offset and the measurements of the plurality of CSI-RSs.

30. The apparatus of claim 29, wherein the instructions are further executable by the processor to:
calculate the time offset based at least in part on the at least one CSI configuration parameter.

31. The apparatus of claim 29, wherein the instructions are further executable by the processor to:
transmit an initial co-phase vector between the plurality of virtual antennas of the base station.

32. The apparatus of claim 29, wherein the instructions are further executable by the processor to:
receive an indication of a time offset configuration from the base station, the time offset configuration determined by one of a core network node or the base station.

33. The apparatus of claim 32, wherein the indication is received via downlink control information (DCI) or a radio resource control (RRC) message.

34. The apparatus of claim 33, wherein the instructions are further executable by the processor to:
compute CSI feedback for at least one CSI-RS based at least in part on the time offset configuration, wherein the feedback message includes the computed CSI feedback.

35. The apparatus of claim 29, wherein the control message comprises downlink control information (DCI) from the base station, the DCI comprising the at least one CSI configuration parameter.

36. The apparatus of claim 35, wherein a format of the DCI comprises at least one of a special DCI format or a DCI format for CSI-RS.

37. The apparatus of claim 35, wherein the DCI is for the UE or a group of UEs including the UE.

38. The apparatus of claim 37, wherein the control message comprises a radio resource control (RRC) message comprising the at least one CSI configuration parameter.

39. The apparatus of claim 29, wherein the instructions are further executable by the processor to:

determine a fixed value of the time offset for use in performing the measurements, wherein the feedback message is based at least in part on the fixed value of the time offset.

40. The apparatus of claim 29, wherein the instructions are further executable by the processor to:
select the time offset from a set of time offset candidates based at least in part on the measurements of the plurality of CSI-RSs.

41. The apparatus of claim 40, wherein the set of time offset candidates is determined based at least in part on the control message.

42. The apparatus of claim 29, wherein the instructions are further executable by the processor to:
determine, based at least in part on the time offset, at least one CSI parameter from a group consisting of: a rank indicator, an initial co-phase indicator, a precoder matrix indicator, and a channel quality indicator, wherein the determined at least one CSI parameter is included in the feedback message.

43. The apparatus of claim 29, wherein the instructions are further executable by the processor to:
select, based on a determination that the time offset equals 0 or a determination that a selected CSI resource corresponds to the time offset equal to 0, a closed loop transmission scheme procedure for transmitting the feedback message.

44. An apparatus for wireless communication, comprising:
a processor;
memory coupled with the processor; and
instructions stored in the memory and operable, when executed by the processor, to cause the apparatus to:
receive, from a base station, a first channel state information (CSI) reference signal (CSI-RS) of a plurality of CSI-RSs over a first set of resources corresponding to a first beam and a first delay offset, the first delay offset between a plurality of virtual antennas of the base station;
determine a first CSI parameter based at least in part on the first CSI-RS; and
transmit, to the base station, a feedback message based at least in part on the determined first CSI parameter.

45. The apparatus of claim 44, wherein the instructions are further executable by the processor to:
receive a second CSI-RS of the plurality of CSI-RSs over a second set of resources corresponding to a second beam and a second delay offset;
determine a second CSI parameter based at least in part on the second CSI-RS; and
transmit, to the base station, the feedback message based at least in part on the determined the second CSI parameter.

46. The apparatus of claim 44, wherein the feedback message comprises at least one of a CSI Resource Indicator (CRI), a Rank Indicator (RI), a Precoder Matrix Indicator (PMI), an initial co-phase indicator, a Channel Quality Indicator (CQI), or a combination thereof.

47. The apparatus of claim 44, wherein the instructions are further executable by the processor to:
select a closed loop transmission scheme procedure for transmitting the feedback message.

48. An apparatus for wireless communication, comprising:
  a processor;
  memory coupled with the processor; and
  instructions stored in the memory and operable, when executed by the processor, to cause the apparatus to:
    transmit, by a base station, a control message comprising at least one channel state information (CSI) configuration parameter and a request to report a time offset between a plurality of virtual antennas of the base station and measurements of a plurality of CSI reference signals (CSI-RSs) associated with the plurality of virtual antennas of the base station; and
    receive, from a user equipment (UE) and in response to the request, a feedback message based at least in part on the time offset and the measurements of the plurality of CSI-RSs.

49. The apparatus of claim 48, wherein the instructions are further executable by the processor to:
  transmit, to the UE, an indication of a time offset configuration, the time offset configuration determined by one of a core network node or the base station.

50. The apparatus of claim 49, wherein the indication is transmitted via downlink control information (DCI), a radio resource control message, or within the control message.

51. The apparatus of claim 49, wherein the feedback message includes CSI feedback for at least one CSI-RS of the plurality of CSI-RSs based at least in part on the time offset configuration.

52. The apparatus of claim 48, wherein the instructions are further executable by the processor to:
  configure a set of time offset candidates for the UE, wherein the control message includes the set of time offset candidates.

53. The apparatus of claim 48, wherein the instructions are further executable by the processor to:
  receive, from the UE, a UE time offset and at least one CSI parameter based at least in part on the UE time offset, wherein the at least one CSI parameter is included in the feedback message.

54. The apparatus of claim 48, wherein the instructions are further executable by the processor to:
  receive, from the UE, at least one CSI parameter based at least in part on a fixed time offset, wherein the at least one CSI parameter is included in the feedback message.

55. An apparatus for wireless communication, comprising:
  a processor;
  memory coupled with the processor; and
  instructions stored in the memory and operable, when executed by the processor, to cause the apparatus to:
    transmit, by a base station and to a user equipment (UE), a first channel state information (CSI) reference signal (CSI-RS) of a plurality of CSI-RSs over a first set of resources corresponding to a first beam and a first delay offset, the first delay offset between a plurality of virtual antennas of the base station; and
    receive, from the UE, a feedback message that includes a first CSI parameter, wherein the first CSI parameter is based at least in part on the first CSI-RS.

56. The apparatus of claim 55, wherein the instructions are further executable by the processor to:
  transmit, to the UE, a second CSI-RS of the plurality of CSI-RSs over a second set of resources corresponding to a second beam and a second delay offset, wherein the feedback message includes a second CSI parameter based at least in part on the second CSI-RS.

* * * * *